United States Patent
Noguchi et al.

(10) Patent No.: US 9,563,302 B2
(45) Date of Patent: Feb. 7, 2017

(54) DISPLAY DEVICE WITH TOUCH DETECTION, DRIVE CIRCUIT, DRIVING METHOD, AND ELECTRONIC UNIT

(71) Applicant: Japan Display Inc., Tokyo (JP)

(72) Inventors: Koji Noguchi, Kanagawa (JP); Yoshitoshi Kida, Kanagawa (JP); Takayuki Nakanishi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/008,949

(22) Filed: Jan. 28, 2016

(65) Prior Publication Data

US 2016/0147349 A1    May 26, 2016

Related U.S. Application Data

(63) Continuation of application No. 14/540,804, filed on Nov. 13, 2014, now Pat. No. 9,280,954, which is a continuation of application No. 13/091,621, filed on Apr. 21, 2011, now Pat. No. 8,933,351.

(30) Foreign Application Priority Data

Apr. 28, 2010  (JP) .................................. 2010-104051

(51) Int. Cl.
  *G06F 3/041*   (2006.01)
  *G06F 3/044*   (2006.01)
  *G09G 3/36*    (2006.01)
  *G09G 5/18*    (2006.01)

(52) U.S. Cl.
  CPC ............. *G06F 3/0412* (2013.01); *G06F 3/044* (2013.01); *G06F 3/0416* (2013.01); *G09G 3/3674* (2013.01); *G09G 5/18* (2013.01)

(58) Field of Classification Search
  CPC ....................................................... G06F 3/044
  USPC ..................... 345/173–178; 178/18.01–20.01
  See application file for complete search history.

(56) References Cited

U.S. PATENT DOCUMENTS

| 5,945,973 | A  | 8/1999 | Sakai et al. |
| 2001/0011979 | A1 | 8/2001 | Hasegawa et al. |
| 2003/0146890 | A1 | 8/2003 | Sasaki |
| 2004/0119455 | A1 | 6/2004 | Sunter |
| 2008/0062140 | A1 | 3/2008 | Hotelling et al. |

(Continued)

FOREIGN PATENT DOCUMENTS

| JP | 04-371916 | 12/1992 |
| JP | 09-120334 | 5/1997 |

(Continued)

OTHER PUBLICATIONS

Taiwanese Office Action issued Aug. 14, 2014 in corresponding Taiwanese Patent Application No. 100111096.

(Continued)

*Primary Examiner* — Chad Dicke
(74) *Attorney, Agent, or Firm* — K&L Gates LLP

(57) ABSTRACT

A display device includes: a plurality of drive electrodes; a plurality of detection electrodes intersecting the plurality of drive electrodes; and a scan driving unit performing a first scan drive and a second scan drive. The first scan drive allows a display drive signal for driving the display elements to be applied to each of the plurality of common drive electrodes, and the second scan drive allows a touch detection drive signal for detecting an external proximity object to be applied to each of the plurality of common drive electrodes.

1 Claim, 29 Drawing Sheets

(56) References Cited

U.S. PATENT DOCUMENTS

| | | |
|---|---|---|
| 2008/0309627 A1 | 12/2008 | Hotelling et al. |
| 2009/0231302 A1 | 9/2009 | Hsueh et al. |
| 2009/0256818 A1 | 10/2009 | Noguchi et al. |
| 2010/0079401 A1 | 4/2010 | Staton |
| 2010/0182273 A1 | 7/2010 | Noguchi et al. |
| 2010/0321315 A1 | 12/2010 | Oda et al. |

FOREIGN PATENT DOCUMENTS

| | | |
|---|---|---|
| JP | 2003-228342 | 8/2003 |
| JP | 2009-244958 | 10/2009 |
| JP | 2009-258182 | 11/2009 |
| JP | 2009-540374 | 11/2009 |
| WO | 2007/146785 | 12/2007 |
| WO | 2010036649 | 4/2010 |

OTHER PUBLICATIONS

Japanese Office Action issued May 20, 2014 in corresponding Japanese Patent Application No. 2010-104051.
Japanese Office Action issued Oct. 18, 2016 in corresponding Japanese Application No. 2015-242749.

DISPLAY DEVICE WITH TOUCH DETECTION, DRIVE CIRCUIT, DRIVING METHOD, AND ELECTRONIC UNIT

CROSS REFERENCES TO RELATED APPLICATIONS

The present application is a continuation of U.S. patent application Ser. No. 14/540,804 filed Nov. 13, 2014, which application is a continuation of U.S. patent application Ser. No. 13/091,621 filed Apr. 21, 2011, issued as U.S. Pat. No. 8,933,351 on Jan. 13, 2015, which application claims priority to Japanese Priority Patent Application JP 2010-104051 filed in the Japan Patent Office on Apr. 28, 2010, the entire content of which is hereby incorporated by reference.

BACKGROUND

The present application relates to a display device with touch detection of an electrostatic capacitance type, a drive circuit and a driving method used for the device, and an electronic unit having such a display device with a touch detection.

In recent years, attention is paid to a display device to which a contact detecting device called a touch panel is attached or with which a touch panel is integrated. The user enters information using various button images or the like displayed in the display device instead of normal mechanical buttons. Since such a display device having the touch panel does not need input devices such as a keyboard, a mouse, and a keypad, the display device is being increasingly used in not only a computer but also a portable information terminal such as a cellular phone.

One of the touch detecting methods is a capacitive touch detecting method. For example, in Japanese Unexamined Patent Application Publication No. 2009-244958, a display device is proposed, in which a common electrode for display that is originally provided for the display device is also used as one of a pair of electrodes for a touch sensor, and the other electrode (touch detection electrode) is disposed so as to intersect the common electrode. An electrostatic capacitance is formed between the pair of electrodes for a touch sensor, and changes according to an external proximity object. In the display device, a display operation is performed by sequentially applying a drive signal to the common electrode and performing a line-sequential scan, and a touch detecting operation is performed by analyzing a touch detection signal which appears in the touch detection electrode in accordance with the drive signal.

SUMMARY

Since not only a touch component based on the drive signal for the touch detecting operation but also a touch component based on the drive signal for the display operation (that is, display noise) are included in the touch detection signal, an erroneous operation may be caused.

It is desirable to provide a display device with touch detection, a drive circuit, a driving method, and an electronic unit in which the influence of the display operation on the touch detecting operation is minimized.

A display device with touch detection according to a first embodiment includes: display elements; a plurality of common drive electrodes arranged in parallel to extend in one direction; a plurality of detection electrodes arranged in parallel to extend in a direction which intersects the common drive electrodes and allowing electrostatic capacitance to be formed at each intersection; a scan driving unit performing a first scan drive and a second scan drive, the first scan drive allowing a display drive signal for driving the display elements to be time-divisionally applied to each of the plurality of common drive electrodes in succession, the second scan drive allowing a touch detection drive signal for detecting an external proximity object to be time-divisionally applied to each of the plurality of common drive electrodes in succession; and a detection circuit detecting the external proximity object based on a touch detection signal which is outputted from the detection electrode in response to application of the touch detection drive signal. When a common drive electrode selected to be driven in the first scan drive is coincident with a common drive electrode selected to be driven in the second scan drive, the scan driving unit applies either the display drive signal or the touch detection drive signal to the coincident common drive electrode, and when a common drive electrode selected to be driven in the first scan drive is different from a common drive electrode selected to be driven in the second scan drive, the scan driving unit drives the respective common drive electrodes so that waveform of the touch detection drive signal transits at a timing within a period accompanied by no waveform transition of the display drive signal.

A display device with touch detection according to a second embodiment includes: display elements; a plurality of common drive electrodes arranged in parallel to extend in one direction; a plurality of detection electrodes arranged in parallel to extend in a direction which intersects the common drive electrodes and allowing electrostatic capacitance to be formed at each intersection; a scan driving unit performing a first scan drive and a second scan drive, the first scan drive allowing a display drive signal for driving the display elements to be time-divisionally applied to each of the plurality of common drive electrodes in succession, the second scan drive allowing a touch detection drive signal for detecting an external proximity object to be time-divisionally applied to each of the plurality of common drive electrodes in succession; and a detection circuit detecting the external proximity object based on a touch detection signal which is outputted from the detection electrode in response to application of the touch detection drive signal. The scan driving unit drives the common drive electrodes so that a common drive electrode selected to be driven in the first scan drive is not coincident with a common drive electrode selected to be driven in the second scan drive, and the scan driving unit drives the respective common drive electrodes so that waveform of the touch detection drive signal transits at a timing within a period accompanied by no waveform transition of the display drive signal.

A display device with touch detection according to a third embodiment includes: display elements; a plurality of common drive electrodes arranged in parallel to extend in one direction; a plurality of detection electrodes arranged in parallel to extend in a direction which intersects the common drive electrodes and allowing electrostatic capacitance to be formed at each intersection; a scan driving unit time-divisionally applying a drive signal including a DC waveform and a pulse waveform to the plurality of common drive electrodes in succession, the DC waveform corresponding to a display period which is allocated for performing display by the display element, the pulse waveform corresponding to a touch detection period which is allocated for detecting an external proximity object, and the display period being separated from the display period; and a detection circuit detecting the external proximity object based on a touch detection signal which is outputted from the detection electrode in response to application of the drive signal.

A display device with touch detection according to a fourth embodiment includes: a display unit displaying an image, and including display elements, a common electrode connected to the display elements, and a common signal driving unit applying a common signal to the common electrode; and a touch detecting unit detecting an external proximity object, the touch detecting unit including: a plurality of common drive electrodes arranged in parallel to extend in one direction; a plurality of detection electrodes arranged in parallel to extend in a direction which intersects the common drive electrodes and allowing electrostatic capacitance to be formed at each intersection; a scan driving unit performing a scan drive of allowing a touch detection drive signal for detecting the external proximity object to be time-divisionally applied to each of the plurality of common drive electrodes in succession; and a detection circuit detecting the external proximity object based on a touch detection signal which is outputted from the detection electrode in response to application of the touch detection drive signal. The common signal driving unit and the scan driving unit drive the common signal and the touch detection drive signal so that waveform of the touch detection drive signal transits at a timing within a period accompanied by no waveform transition of the common signal.

A display device according to yet another embodiment includes: a plurality of drive electrodes; a plurality of detection electrodes intersecting the plurality of drive electrodes; and a scan driving unit performing a first scan drive and a second scan drive, the first scan drive allowing a display drive signal for driving the display elements to be applied to each of the plurality of common drive electrodes, the second scan drive allowing a touch detection drive signal for detecting an external proximity object to be applied to each of the plurality of common drive electrodes.

A display device according to still another embodiment includes: a plurality of drive electrodes; a plurality of detection electrodes intersecting the plurality of drive electrodes; and a scan driving unit performing a first scan drive and a second scan drive, the first scan drive allowing a display drive signal to be applied to each of the plurality of common drive electrodes, the second scan drive allowing a touch detection drive signal to be applied to each of the plurality of common drive electrodes at a scan interval different from that of the display drive signal in the first scan drive. When a common drive electrode selected to be driven in the first scan drive is coincident with a common drive electrode selected to be driven in the second scan drive, the scan driving unit applies either the display drive signal or the touch detection drive signal to the coincident common drive electrode.

A drive circuit according to an embodiment includes: a scan driving unit performing a first scan drive and a second scan drive on a display unit with touch detection, the display unit with the touch detection including display elements, a plurality of common drive electrodes arranged in parallel to extend in one direction, and a plurality of detection electrodes arranged in parallel to extend in a direction which intersects the common drive electrodes and allowing electrostatic capacitance to be formed at each intersection, the first scan drive allowing a display drive signal for driving the display elements to be time-divisionally applied to each of the plurality of common drive electrodes in succession, and the second scan drive allowing a touch detection drive signal for detecting an external proximity object to be time-divisionally applied to each of the plurality of common drive electrodes in succession; and a control unit controlling the scan driving unit. When a common drive electrode selected to be driven in the first scan drive is coincident with a common drive electrode selected to be driven in the second scan drive, the scan driving unit applies either the display drive signal or the touch detection drive signal to the coincident common drive electrode, and when a common drive electrode selected to be driven in the first scan drive is different from a common drive electrode selected to be driven in the second scan drive, the scan driving unit drives the respective common drive electrodes so that waveform of the touch detection drive signal transits at a timing within a period accompanied by no waveform transition of the display drive signal.

A driving method according to an embodiment includes the steps of: performing a first scan drive on the display unit with touch detection; and performing a second scan drive on the display unit with the touch detection, the display unit with the touch detection including display elements, a plurality of common drive electrodes arranged in parallel to extend in one direction, and a plurality of detection electrodes arranged in parallel to extend in a direction which intersects the common drive electrodes and allowing electrostatic capacitance to be formed at each intersection, the first scan drive allowing a display drive signal for driving the display elements to be time-divisionally applied to each of the plurality of common drive electrodes in succession, and the second scan drive allowing a touch detection drive signal for detecting an external proximity object to be time-divisionally applied to each of the plurality of common drive electrodes in succession. When a common drive electrode selected to be driven in the first scan drive is coincident with a common drive electrode selected to be driven in the second scan drive, either the display drive signal or the touch detection drive signal is applied to the coincident common drive electrode, and when a common drive electrode selected to be driven in the first scan drive is different from a common drive electrode selected to be driven in the second scan drive, the respective common drive electrodes are driven so that waveform of the touch detection drive signal transits at a timing within a period accompanied by no waveform transition of the display drive signal.

An electronic unit according to an embodiment includes: a display device with touch detection; and a control unit performing an operation control that utilizes the display device with the touch detection. The display device with the touch detection including: display elements; a plurality of common drive electrodes arranged in parallel to extend in one direction; a plurality of detection electrodes arranged in parallel to extend in a direction which intersects the common drive electrodes and allowing electrostatic capacitance to be formed at each intersection; a scan driving unit performing a first scan drive and a second scan drive, the first scan drive allowing a display drive signal for driving the display elements to be time-divisionally applied to each of the plurality of common drive electrodes in succession, the second scan drive allowing a touch detection drive signal for detecting an external proximity object to be time-divisionally applied to each of the plurality of common drive electrodes in succession; and a detection circuit detecting the external proximity object based on a touch detection signal which is outputted from the detection electrode in response to application of the touch detection drive signal. When a common drive electrode selected to be driven in the first scan drive is coincident with a common drive electrode selected to be driven in the second scan drive, the scan driving unit applies either the display drive signal or the touch detection drive signal to the coincident common drive electrode, and when a common drive electrode selected to be driven in the first scan drive is different from a common drive electrode selected to be driven in the second scan drive, the scan driving unit drives the respective common drive electrodes so that waveform of the touch detection drive signal transits at a timing within a period accompanied by no waveform transition of the display drive signal.

The electronic unit is any display device having a function of detecting a touch or proximity, such as a television apparatus, a digital camera, a personal computer, a video camera, and a portable terminal device such as a cellular phone.

In the display devices with the touch detection according to the first and second embodiments, and the drive circuit, the driving method, and the electronic unit according to the embodiments, the display drive signal and the touch detection drive signal applied to the common drive electrodes are transmitted to the detection electrodes via the electrostatic capacitance, and are output as touch detection signals. When the common drive electrode selected to be driven in the first scan drive is different from the common drive electrode selected to be driven in the second scan drive, the respective common drive electrodes are driven so that waveform of the touch detection drive signal transits at the timing within the period accompanied by no waveform transition of the display drive signal. Thereby, the touch detection signal corresponding to the touch detection drive signal is output separately, from the viewpoint of time, from a signal component corresponding to the display drive signal.

In the display device with the touch detection according to the third embodiment, the drive signal applied to the common drive electrodes is transmitted to the detection electrodes via the electrostatic capacitance, and is output as touch detection signals. The drive signal has a pulse waveform only in the touch detection period and has a DC waveform in the display period. Therefore, only the pulse waveform part is transmitted to the detection electrode. Thus, the touch detection signal corresponding to the pulse waveform part in the drive signal is output from the detection electrode.

In the display device with the touch detection according to the fourth embodiment, the touch detection drive signal applied to the common drive electrode in the touch detecting unit is transmitted to the detection electrode via the electrostatic capacitance and is output as a touch detection signal. The waveform of the touch detection drive signal is allowed to transit at the timing within the period accompanied by no waveform transition of the common signal of the display unit. Thereby, for example, even when the common signal is transmitted to the detection electrode via the electrostatic capacitance existing between the common electrode of the display unit and the detection electrode of the touch detecting unit, the touch detection signal corresponding to the touch detection drive signal is outputted separately, from the viewpoint of time, from a signal component corresponding to the common signal.

Advantageously, the display device with touch detection further includes a pixel signal driving unit supplying a pixel signal to each of the display elements in a display period, and the common drive electrode is driven so that the waveform of the touch detection drive signal transits at a timing out of the display period.

Advantageously, the display drive signal has a rectangular waveform with a polarity inverted for every scan line.

Advantageously, the touch detection drive signal is a signal established by shifting a phase of the display drive signal.

Advantageously, the detection circuit performs sampling on the touch detection signal at a preceding timing and a subsequent timing of the waveform transition timing of the touch detection drive signal, and determines the difference between two sampled values.

Advantageously, the plurality of common drive electrodes are partitioned into blocks each including a predetermined number of common drive electrodes, and the scan driving unit drives the plurality of common drive electrodes for each of the blocks.

Advantageously, in the display device with the touch detection according to the third embodiment, the pulse waveform includes a section of positive voltage and a section of negative voltage with respect to the voltage of the DC waveform.

Advantageously, in the display device with the touch detection according to the third embodiment, a time-averaged voltage of the pulse waveform is equal to the voltage of the DC waveform.

Advantageously, in the display device with the touch detection according to the third embodiment, the pulse waveform includes one of a section of positive voltage and a section of negative voltage with respect to the voltage of the DC waveform.

In the display devices with the touch detection according to the first and the second embodiments, and the drive circuit, the driving method, and the electronic unit according to the embodiments, when the common drive electrode selected to be driven in the first scan drive is different from the common drive electrode selected to be driven in the second scan drive, the respective common drive electrodes are driven so that waveform of the touch detection drive signal transits at the timing within the period accompanied by no waveform transition of the display drive signal. Therefore, it is possible to minimize the influence on the display operation of the touch detecting operation.

In the display device with the touch detection according to the third embodiment, the drive signal having the DC waveform in the display period and having the pulse waveform in the touch detecting period is applied to the common drive electrode. Therefore, it is possible to minimize the influence on the display operation by the touch detecting operation.

In the display device with the touch detection according to the fourth embodiment, the waveform of the touch detection drive signal is allowed to transit at the timing within the period accompanied by no waveform transition of the common signal. Therefore, it is possible to minimize the influence on the display operation of the touch detecting operation.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Embodiments of the present application will be described below in detail with reference to the drawings.
1. Basic principle of capacitive touch detection
2. First Embodiment
3. Second Embodiment
4. Application examples
(Basic Principle of Capacitive Touch Detection)

First, with reference to FIGS. 1 to 3, the basic principle of touch detection in a display device with a touch detecting function (a display device with touch detection) according to embodiments of the present application will be described. The touch detecting method is embodied as a capacitive touch sensor. For example, as illustrated in (A) of FIG. 1, a capacitive element is constructed by using a pair of electrodes (a drive electrode E1 and a touch detection electrode E2) disposed so as to face each other while sandwiching a dielectric D. The structure is expressed as an equivalent circuit illustrated in (B) of FIG. 1. A capacitive element C1 is constructed by the drive electrode E1, the touch detection electrode E2, and the dielectric D. One end of the capacitive element C1 is connected to an AC signal source (drive signal source) S, and the other end P is grounded via a resistor R and is connected to a voltage detector (touch detection circuit) DET. When an AC rectangular wave Sg ((B) of FIG. 3) of a predetermined frequency (for example, about a few kHz to tens kHz) is applied from the AC signal source S to the drive electrode E1 (one end of the capacitive element C1), an output waveform (touch detection signal Vdet) as shown in (A) of FIG. 3 appears in the touch detection electrode E2 (the other end P of the capacitive element C1). The AC rectangular wave Sg corresponds to a drive signal Vcom which will be described later.

Figure 1:
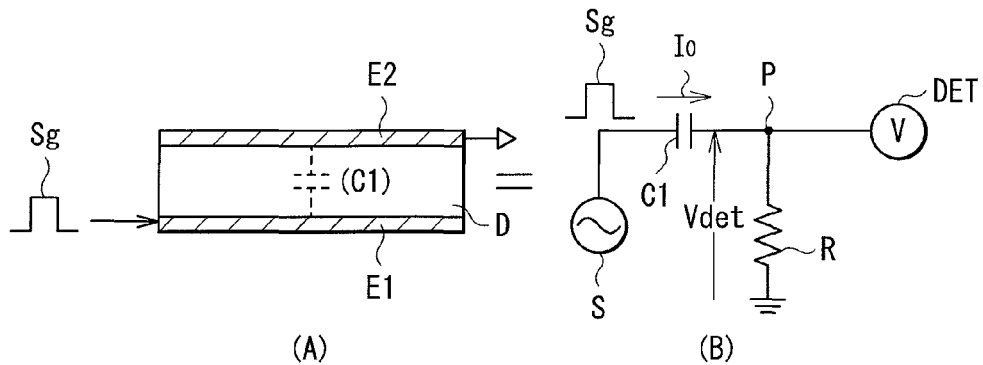
FIG. 1 is a diagram for explaining the basic principle of a touch detection method in a display device with a touch detecting function according to embodiments of the present application and showing a state where a finger is not yet in contact or in proximity.

In a state where a finger is not in contact (or not in proximity), as illustrated in (A) and (B) of FIG. 1, current I0 according to the capacitance value of the capacitive element C1 flows in association with charging/discharging of the capacitive element C1. The potential waveform at the other end P of the capacitive element C1 is, for example, waveform V0 of (A) of FIG. 3 which is detected by the voltage detector DET.

Figure 2:
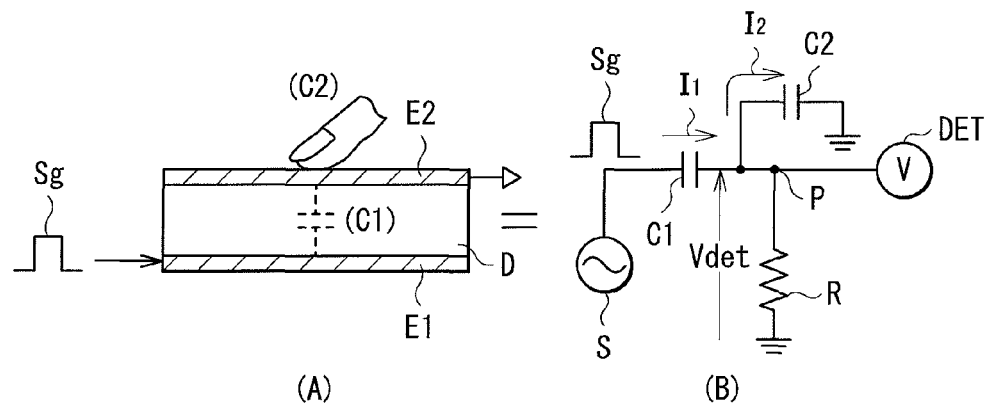
FIG. 2 is a diagram for explaining the basic principle of the touch detection method in the display device with the touch detecting function according to the embodiments of the application and showing a state where a finger is in contact or in proximity.
Figure 3:
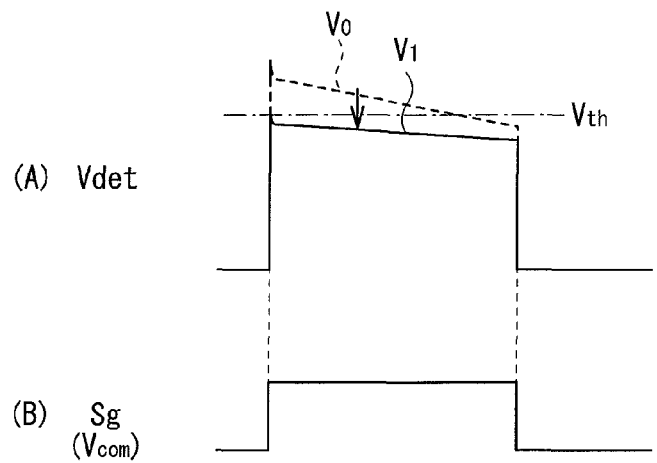
FIG. 3 is a diagram for explaining the basic principle of the touch detection method in the display device with the touch detecting function according to the embodiments of the application and showing an example of the waveforms of a drive signal and a touch detection signal.

On the other hand, in a state where a finger is in contact (or in proximity), as illustrated in FIG. 2, a capacitive element C2 formed by the finger is added in series to the capacitive element C1. In this state, currents I1 and I2 flow in association with charging/discharging of the capacitive elements C1 and C2. The potential waveform at the other end P of the capacitive element C1 at this time is, for example, waveform V1 as illustrated in (A) of FIG. 3, which is detected by the voltage detector DET. The potential at the point P at this time is a voltage-division potential determined by the values of the currents I1 and I2 flowing in the capacitive elements C1 and C2. Consequently, the waveform V1 has a value smaller than the waveform V0 in a non-contact state. The voltage detector DET compares the detected voltage with a predetermined threshold voltage Vth and, when the detected voltage is equal to or higher than the threshold voltage, determines that the finger is in the non-contact state. On the other hand, when the detected voltage is less than the threshold voltage, the voltage detector DET determines that the finger is in the contact state. In such a manner, touch detection is performed.

2. First Embodiment

Configuration Example (General Configuration Example)

Figure 4:
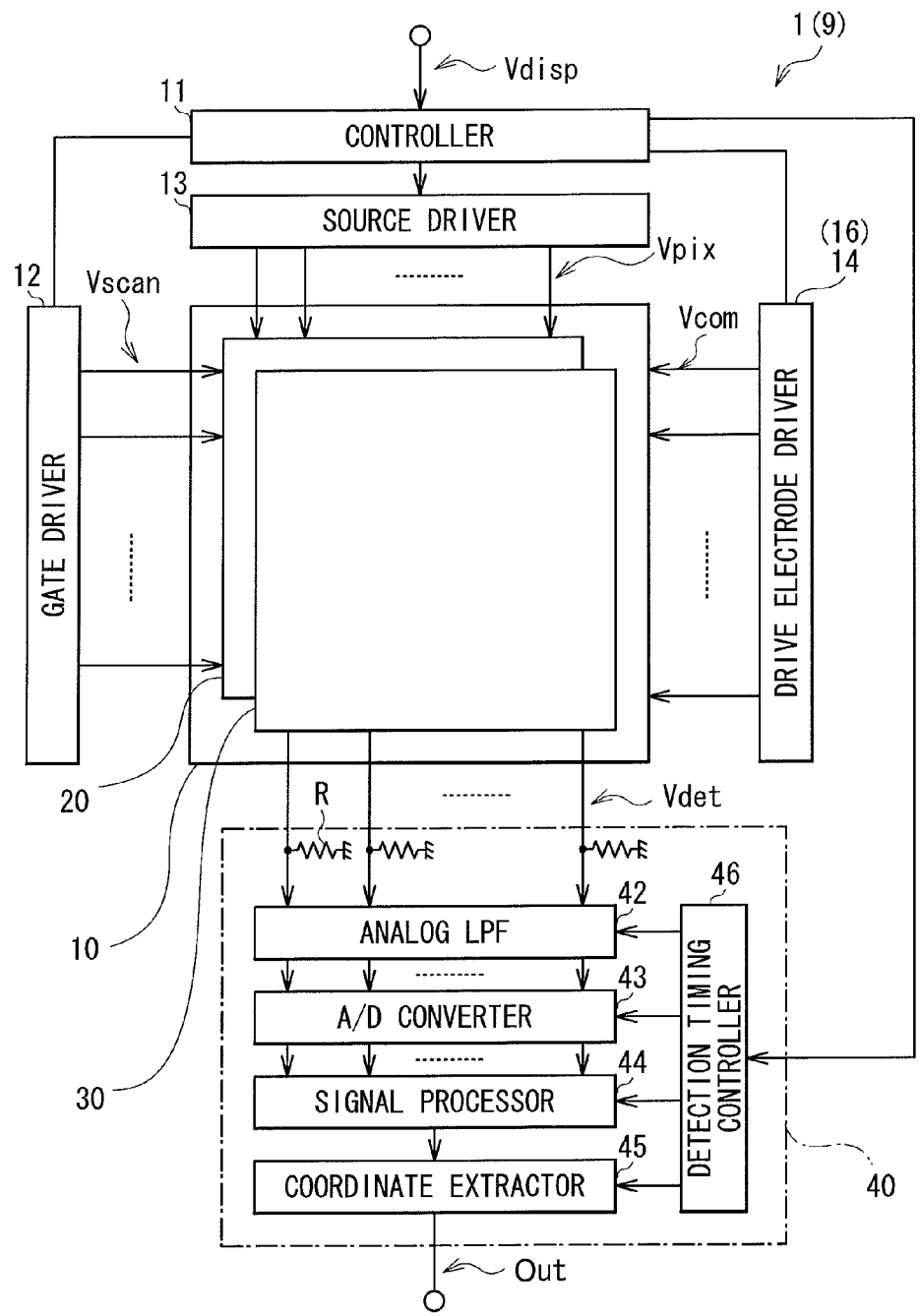
FIG. 4 is a block diagram illustrating an example of the configuration of the display device with the touch detecting function according to a first embodiment.

FIG. 4 illustrates a configuration example of a display device with a touch detecting function (a display device with touch detection) according to a first embodiment. A drive circuit and a driving method for the display device with the touch detecting function according to embodiments of the application are embodies by this embodiment, so that they will be also described. The display device with the touch detecting function uses a liquid crystal display element as a display element, and is a device of a so-called in-cell-type obtained by integrating a liquid crystal display unit constructed by the liquid crystal display element and a capacitive touch detection unit.

A display device 1 with the touch detecting function includes a controller 11, a gate driver 12, a source driver 13, a drive electrode driver 14, a display unit 10 with a touch detecting function, and a touch detection circuit 40.

The controller 11 is a circuit for supplying control signals to the gate driver 12, the source driver 13, the drive electrode driver 14, and the touch detection circuit 40 on the basis of a video signal Vdisp supplied from the outside to control so that they operate synchronously with one another.

The gate driver 12 has a function of sequentially selecting one horizontal line to be subjected to the display driving of the display unit 10 with the touch detecting function on the basis of the control signal supplied from the controller 11. Concretely, as will be described later, the gate driver 12 applies a scan signal Vscan to the gate of a TFT element Tr of a pixel Pix via a scan signal line GCL to sequentially select, as an object of the display driving, one row (one horizontal line) of pixels Pix formed in a matrix in a liquid crystal display unit 20 of the display unit 10 with the touch detecting function.

The source driver 13 is a circuit that supplies the pixel signal Vpix to each of pixels Pix (which will be described later) in the display unit 10 with the touch detecting function on the basis of the control signal supplied from the controller 11. Concretely, as will be described later, the source driver 13 applies a pixel signal Vpix to each of the pixels Pix constructing one horizontal line sequentially selected by the gate driver 12 via the pixel signal line SGL. In the pixels Pix, display of one horizontal line is performed according to the pixel signal Vpix supplied.

The drive electrode driver 14 is a circuit that supplies the drive signal Vcom to a drive electrode COML (which will be described later) of the display unit 10 with the touch detecting function on the basis of the control signal supplied from the controller 11. Concretely, the drive electrode driver 14 drives the drive electrodes COML on the unit basis of a block made of predetermined number of drive electrodes COML, supplies a display drive signal Vcomd to a drive electrode block B performing display operation and a touch detection drive signal Vcomt to a drive electrode block B performing touch detecting operation. In the touch detecting operation, by sequentially applying the touch detection drive signal Vcomt to a plurality of drive electrode blocks B in a time-divisional manner, a block on which the touch detecting operation is to be performed (detection block) is selected sequentially. A touch detection unit 30 outputs the touch detection signal Vdet by detection blocks from a plurality of touch detection electrodes TDL (which will be described later) and supplies the same to the touch detection circuit 40.

The display unit 10 with the touch detecting function is a display device having the touch detecting function. The display unit 10 with the touch detecting function has the liquid crystal display unit 20 and the touch detection unit 30. As will be described later, the liquid crystal display unit 20 is a device performing display by sequentially performing a scan horizontal-line-by-horizontal-line in accordance with the gate signal supplied from the gate driver 12. The touch detection unit 30 operates on the basis of the basic principle of the above-described capacitive touch detection and outputs the touch detection signal Vdet. As will be described later, the touch detection unit 30 performs touch detection by sequentially scanning detection-block-by-detection-block in accordance with the drive electrode driver 14.

The touch detection circuit 40 is a circuit for detecting whether the touch detection unit 30 is touched or not on the basis of the control signal supplied from the controller 11 and the touch detection signal Vdet supplied from the touch detection unit 30 of the display unit 10 with the touch detecting function. In the case where a touch is detected, the touch detection circuit 40 obtains the coordinates or the like of the touch in a touch detection region. The touch detection circuit 40 has an analog LPF (Low Pass Filter) 42, an A/D converter 43, a signal processor 44, a coordinate extractor 45, and a detection timing controller 46. The analog LPF 42 has the coordinate extracting unit 45 and the detection timing controller 46. The analog LPF 42 is a low-pass analog filter for removing high frequency components (noise components) included in the touch detection signal Vdet supplied from a touch detection unit 30, extracting a touch component, and outputting the touch component. A resistor R for applying DC potential (0V) is connected between each of the input terminals of the analog LPF 42 and the ground. In place of the resistor R, for example, a switch may be provided to apply the DC potential (0V) by being set to the on state in predetermined time. The A/D converter 43 is a circuit for converting an analog signal output from the analog LPF 42 to a digital signal. The signal processor 44 is a logic circuit for detecting the presence/absence of a touch in the touch detecting device 30 on the basis of an output signal of the A/D converter 43. The coordinate extractor 45 is a logic circuit for obtaining touch panel coordinates when the touch is detected in the signal processor 44. The detection timing controller 46 controls so that those circuits operate synchronously.

(Display Unit 10 with Touch Detecting Function)

Next, the configuration example of the display unit 10 with the touch detecting function will be described in detail.

Figure 5:
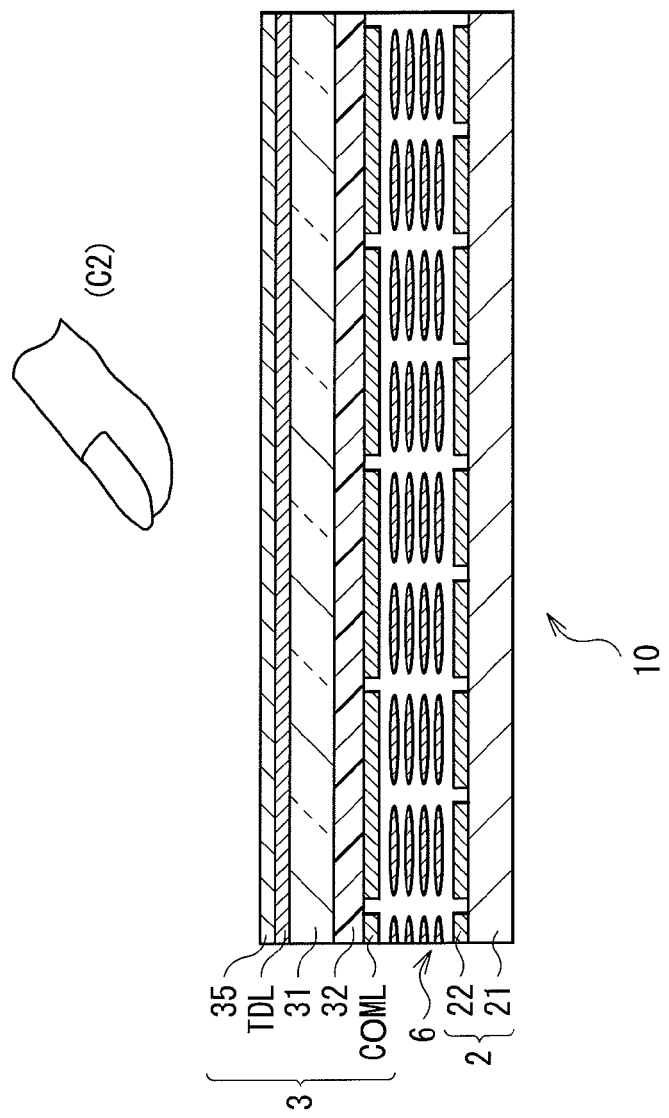
FIG. 5 is a cross section illustrating a schematic sectional structure of a display unit with a touch detecting function according to the first embodiment.

FIG. 5 illustrates an example of a sectional structure of a main part in the display unit 10 with the touch detecting function. The display unit 10 with the touch detecting function has a pixel substrate 2, an opposed substrate 3 disposed so as to be opposed to the pixel substrate 2, and a liquid crystal layer 6 disposed between the pixel substrate 2 and the opposed substrate 3.

The pixel substrate 2 has a TFT substrate 21 as a circuit substrate and a plurality of pixel electrodes 22 disposed in a matrix on the TFT substrate 21. On the TFT substrate 21, although not illustrated, wires such as thin film transistors (TFTs) of pixels, a pixel signal line SGL for supplying the image signal Vpix to each of the pixel electrodes 22, and a scan signal line GCL for driving each of TFTs are formed.

The opposed substrate 3 has a glass substrate 31, a color filter 32 formed on one of the faces of the glass substrate 31, and a plurality of drive electrodes COML formed on the color filter 32. The color filter 32 is constructed by periodically disposing color filter layers of, for example, three colors of red (R), green (G), and blue (B), and a set of three colors of R, G, and B is associated to each display pixel. The drive electrode COML functions as a common drive electrode of the liquid crystal display unit 20 and also functions as a drive electrode of the touch detection unit 30. The drive electrode COML is coupled to the TFT substrate 21 by a not-shown contact conductive pillar. Via the contact conductive pillar, the drive signal Vcom having the AC rectangular waveform (the display drive signal Vcomd and the touch detection drive signal Vcomt) is applied from the TFT substrate 21 to the drive electrode COML. Although the drive electrode COML corresponds to two pixel electrodes 22 in the diagram, the application is not limited thereto. For example, the drive electrode COML may correspond to one pixel electrode 22 or three or more pixel electrodes 22. On the other face of the glass substrate 31, a touch detection electrode TDL as a detection electrode of the touch detection unit 30 is formed. On the touch detection electrode TDL, a polarizer 35 is disposed.

The liquid crystal layer 6 modulates light passing therethrough in accordance with the state of the electric field, and uses liquid crystal in various modes such as TN (twisted nematic), VA (vertical alignment), and ECB (electric-field control birefringence) modes.

An alignment film is disposed between the liquid crystal layer 6 and the pixel substrate 2 and between the liquid crystal layer 6 and the opposed substrate 3, and an incidence-side polarizer is disposed on the under face side of the pixel substrate 2 (the films are not shown).

Figure 6:
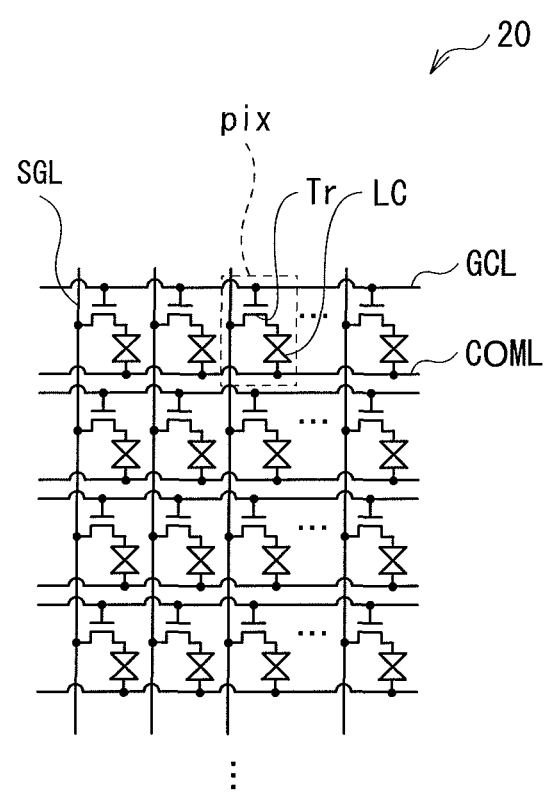
FIG. 6 is a circuit diagram illustrating a pixel array of the display unit with the touch detecting function according to the first embodiment.

FIG. 6 illustrates a configuration example of a pixel structure in the liquid crystal display unit 20. The liquid crystal display unit 20 has a plurality of pixels Pix arranged in a matrix. The pixel Pix has a TFT element Tr and a liquid crystal element LC. The TFT element Tr is constructed by a thin film transistor. In the example, the TFT element Tr is constructed by a TFT of an n-channel MOS (Metal Oxide Semiconductor) type. The source of the TFT element Tr is connected to the pixel signal line SGL, the gate is connected to the scan signal line GCL, and the drain is connected to one end of the liquid crystal element LC. One end of the liquid crystal element LC is connected to the drain of the TFT element Tr, and the other end is connected to the drive electrode COML.

The pixel Pix is connected to another pixel Pix belonging to the same row in the liquid crystal display unit 20 by the scan signal line GCL. The scan signal line GCL is connected to the gate driver 12, and from the gate driver 12, the scan signal Vscan is supplied. The pixel Pix is connected to another pixel Pix belonging to the same column in the liquid crystal display unit 20 by the pixel signal line SGL. The pixel signal line SGL is connected to the source driver 13, and from the source driver 13, the pixel signal Vpix is supplied.

Further, the pixel Pix is connected to another pixel Pix belonging to the same row in the liquid crystal display unit 20 by the drive electrode COML. The drive electrode COML is connected to the drive electrode driver 14, and from the drive electrode driver 14, the drive signal Vcom (the display drive signal Vcomd or the touch detection drive signal Vcomt) is supplied. In the example, the plurality of pixels Pix belonging to the same row share the single drive electrode COML. As shown in FIG. 5, the plurality of pixels Pix belonging to a plurality of rows (two rows in FIG. 5) may share one drive electrode COML.

With the configuration, in the liquid crystal display unit 20, the gate driver 12 drives so as to line-sequentially scan the scan signal linens GCL in a time-divisional manner, thereby sequentially selecting one horizontal line. The source driver 13 supplies the pixel signal Vpix to the pixels Pix belonging to that one horizontal line, thereby performing display by horizontal-line by horizontal-line. At the time of performing the display operation, the drive electrode driver 14 applies the display drive signal Vcomd to the drive electrode block B including the drive electrode COML corresponding to that one horizontal line.

Figure 7:
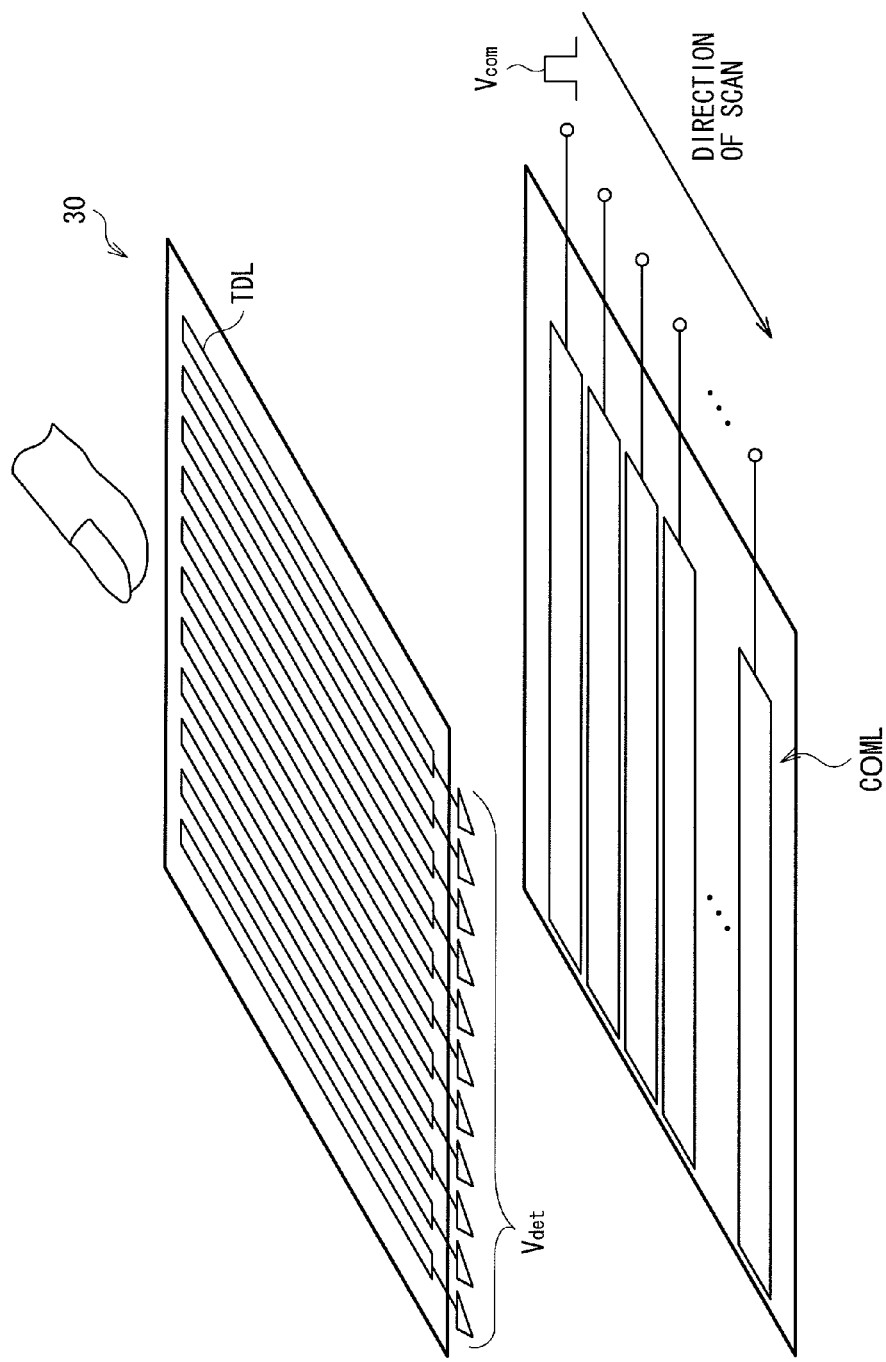
FIG. 7 is a perspective view illustrating an example of the configuration of drive electrodes and touch detection electrodes in the display unit with the touch detecting function according to the first embodiment.

FIG. 7 perspectively illustrates a configuration example of the touch detection unit 30. The touch detection unit 30 is constructed by the drive electrode COML and the touch detection electrode TDL provided for the opposed substrate 3. The drive electrode COML is constructed by a stripe-shaped electrode pattern extending in the horizontal directions in the diagram. At the time of performing the touch detecting operation, in each of the electrode patterns, the touch detection drive signal Vcomt is sequentially supplied by the drive electrode driver 14 to each of the drive signal blocks B and, as will be described later, the line sequential scan driving is performed. The touch detection electrode TDL is constructed by a stripe-shaped electrode pattern extending in a direction orthogonal to the extension direction of the electrode pattern of the drive electrode COML. The electrode patterns of the touch detection electrode TDL are connected to the inputs of the analog LPF 42 in the touch detection circuit 40. Electrostatic capacitance is formed in the intersecting part of the electrode patterns crossing each other by the drive electrode COML and the touch detection electrode TDL.

With the configuration, in the touch detection unit 30, at the time of performing the touch detecting operation, the drive electrode driver 14 drives so as to line-sequentially scan the drive electrode block B in a time-divisional manner, thereby sequentially selecting one detection block. By outputting the touch detection signal Vdet from the touch detection electrode TDL, the touch detection of one detection block is performed. That is, the drive electrode block B corresponds to the drive electrode E1 in the basic principle of touch detection illustrated in FIGS. 1 to 3. The touch detection electrode TDL corresponds to the touch detection electrode E2, and the touch detection unit 30 detects a touch in accordance with the basic principle. As illustrated in FIG. 7, by the intersecting electrode patterns, the capacitive touch sensor is constructed in a matrix shape. Therefore, by scanning the entire touch detection face of the touch detection unit 30, the position in which an external object comes into contact or proximity is detected.

The liquid crystal element LC corresponds to a concrete example of the "display element" in one embodiment. The drive electrode COML corresponds to a concrete example of a "common drive electrode" in one embodiment. The touch detection electrode TDL corresponds to a concrete example of a "detection electrode" in one embodiment. The drive electrode driver 14 corresponds to a concrete example of a "scan driving unit" in one embodiment. The touch detection circuit 40 corresponds to a concrete example of a "detection circuit" in one embodiment.

(Operation and Action)

The operation and action of the display device 1 with the touch detecting function of the embodiment will now be described.

(Outline of General Operation)

The controller 11 supplies the control signals to each of the gate driver 12, the source driver 13, the drive electrode driver 14, and the touch detection circuit 40 on the basis of the video signal Vdisp supplied from the outside, to control so that they operate synchronously with one another. The gate driver 12 supplies the scan signal Vscan to the liquid crystal display unit 20 on the basis of the control signal supplied from the controller 11 to sequentially select one horizontal line as an object of display driving. The source driver 13 supplies the pixel signal Vpix to each of pixels Pix constructing one horizontal line selected by the gate driver 12, on the basis of the control signal supplied from the controller 11. The drive electrode driver 14 applies the display drive signal Vcomd to the drive electrode block B according to one horizontal line in the display operation on the basis of the control signal supplied from the controller 11. In the touch detecting operation, the drive electrode driver 14 sequentially applies the touch detection drive signal Vcomt to the drive electrode block B according to the touch detecting operation, thereby sequentially selecting one detection block. The display unit 10 with the touch detecting function performs the displaying operation on the basis of the signals supplied from the gate driver 12, the source driver 13, and the drive electrode driver 14, performs the touch detecting operation on the basis of the signal supplied from the drive electrode driver 14, and outputs the touch detection signal Vdet from the touch detection electrode TDL. The analog LPF 42 removes high frequency components in the touch detection signal Vdet and outputs the resultant. The A/D converter 43 converts an analog signal output from the analog LPF 42 to a digital signal. The signal processor 44 detects the presence/absence of a touch in the touch detecting device 30 on the basis of an output signal of the A/D converter 43. The coordinate extractor 45 obtains touch panel coordinates when the touch is detected in the signal processor 44. The detection timing controller 46 controls so that the analog LPF 42, the A/D converter 43, the signal processor 44, and the coordinate extractor 45 operate synchronously.

The detailed operation of the display device 1 with the touch detecting function will be described below.

(Detailed Operation of Drive Electrode Driver 14)

Figure 8:
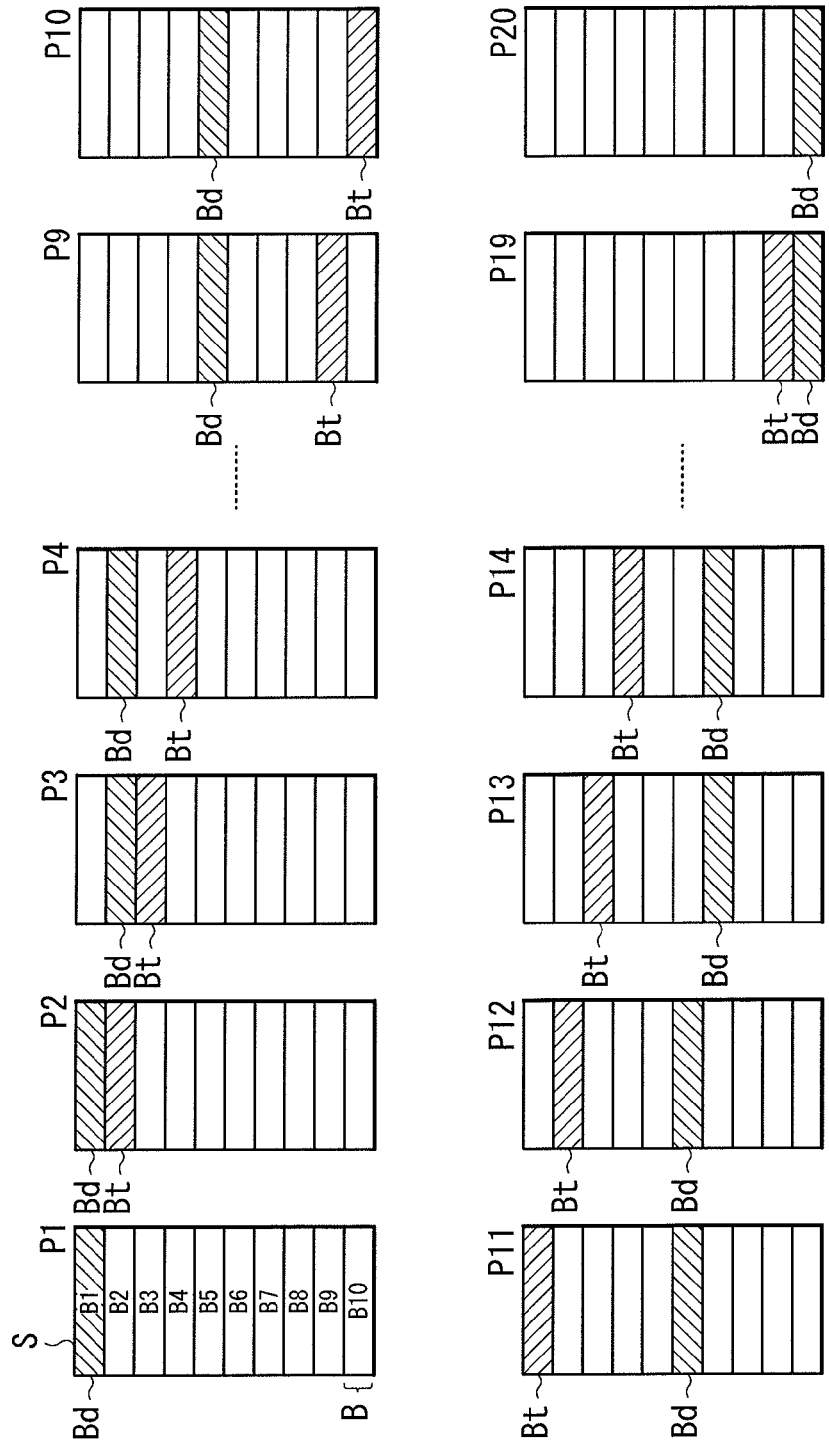
FIG. 8 is a schematic diagram illustrating an example of the operation of a drive electrode driver according to the first embodiment.

FIG. 8 schematically illustrates an operation example of the drive electrode driver 14. FIG. 8 shows operation of applying the drive signal Vcom (the display drive signal Vcomd and the touch detection drive signal Vcomt) by the drive electrode driver 14 to drive electrode blocks B1 to B10 in the case where the display touch detection face S is constructed by the ten drive electrode blocks B1 to B10. A drive electrode block Bd is a drive electrode block B to which the display drive signal Vcomd is applied. A drive electrode block Bt is a drive electrode block B to which the touch detection drive signal Vcomt is applied. In the example, for convenience of explanation, the number of drive electrode blocks B is ten, although it is not limited thereto.

In periods P1 to P20, the drive electrode driver 14 sequentially selects the drive electrode block Bd as an object of display operation, applies the display drive signal Vcomd, and scans all of the drive electrode blocks B. On the other hand, in each of the periods P1 to P10 and the periods P11 to P20, the drive electrode driver 14 sequentially selects the drive electrode block Bt as an object of the touch detecting operation, applies the touch detection drive signal Vcomt, and scans all of the drive electrode blocks B. That is, the drive electrode driver 14 performs a scan with the touch detection drive signal Vcomt in time which is the half of the scan time (1F) with the display drive signal Vcomd. The operation in each of the periods P1 to P20 will be described in detail below.

First, in the period P1, the drive electrode driver 14 selects the drive electrode block B1 as an object of display driving (drive electrode block Bd) and applies the display drive signal Vcomd. Accordingly, in the display unit 10 with the touch detecting function, both of the display operation and the touch detecting operation are performed in the region of the drive electrode block B1. That is, in the display unit 10 with the touch detecting function, as will be described later, the touch detecting operation is performed on the basis of the display drive signal Vcomd.

Next, in the period P2, the drive electrode driver 14 successively selects the drive electrode block B1 as an object of display driving (drive electrode block Bd), applies the display drive signal Vcomd, selects the drive electrode block B2 as an object of touch detection driving (drive electrode block Bt), and applies the touch detection drive signal Vcomt. Accordingly, in the display unit 10 with the touch detecting function, the display operation is performed in the region of the drive electrode block B1, and the touch detecting operation is performed in the region of the drive electrode block B2.

Similarly, in the periods P3 to P10, the drive electrode driver 14 sequentially selects the drive electrode block Bd and applies the display drive signal Vcomd, and sequentially selects the drive electrode block Bt and applies the touch detection drive signal Vcomt. Accordingly, in regions of different drive electrode blocks B, the display operation and the touch detecting operation are performed, respectively. In the periods P1 to P10, the drive electrode driver 14 finishes the scan for the touch detecting operation on all of the drive electrode blocks B1 to B10 in the periods P1 to P10.

Next, in the period P11, the drive electrode driver 14 selects the drive electrode block B6 as the object of the display drive (drive electrode block Bd) and applies the display drive signal Vcomd thereto, and selects the drive electrode block B1 as the object of the touch detection drive (drive electrode block Bt) and applies the touch detection drive signal Vcomt thereto. By the operation, in the display unit 10 with the touch detecting function, the display operation is performed in the region of the drive electrode block B6, and the touch detecting operation is performed in the region of the drive electrode block B1. In such a manner, the drive electrode driver 14 starts a scan of the next touch detecting operation from the period P11.

Similarly, in the period P12 to P19, the drive electrode driver 14 sequentially selects the drive electrode blocks Bd and applies the display drive signal Vcomd thereto, and sequentially selects the drive electrode blocks Bt and applies the touch detection drive signal Vcomt thereto. By the operation, the display operation and the touch detecting operation are performed in the regions of the different drive electrode blocks B, respectively.

Next, in the period P20, the drive electrode driver 14 selects the drive electrode block B10 as an object of the display drive (drive electrode block Bd) and applies the display drive signal Vcomd thereto. By the operation, in the display unit 10 with the touch detecting function, both of the display operation and the touch detecting operation are performed in the region of the drive electrode block B10. That is, in the display unit 10 with the touch detecting function, like in the period P1, the touch detecting operation is performed on the basis of the display drive signal Vcomd.

Figure 9:
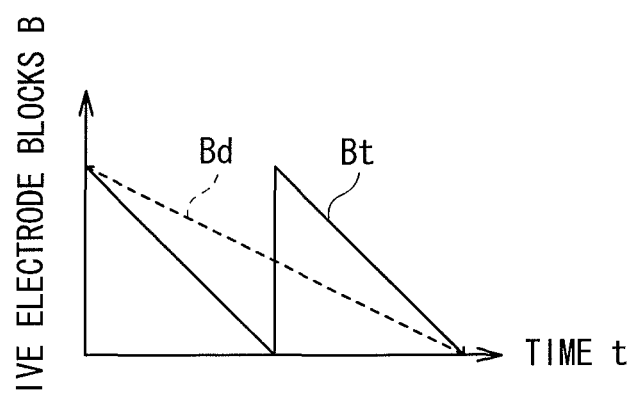
FIG. 9 is another diagram illustrating an example of the operation of the drive electrode driver according to the first embodiment.

FIG. 9 schematically illustrates moving operation in the display-touch detection face S of the drive electrode blocks Bd and Bt shown in FIG. 8. As illustrated in FIG. 9, during the drive electrode block Bd is sequentially selected and scanned once in the display operation, the drive electrode block Bt is sequentially selected and scanned twice in the touch detecting operation. That is, in the example, the scan frequency of the touch detecting operation is twice as high as that of the display operation.

Figure 10:
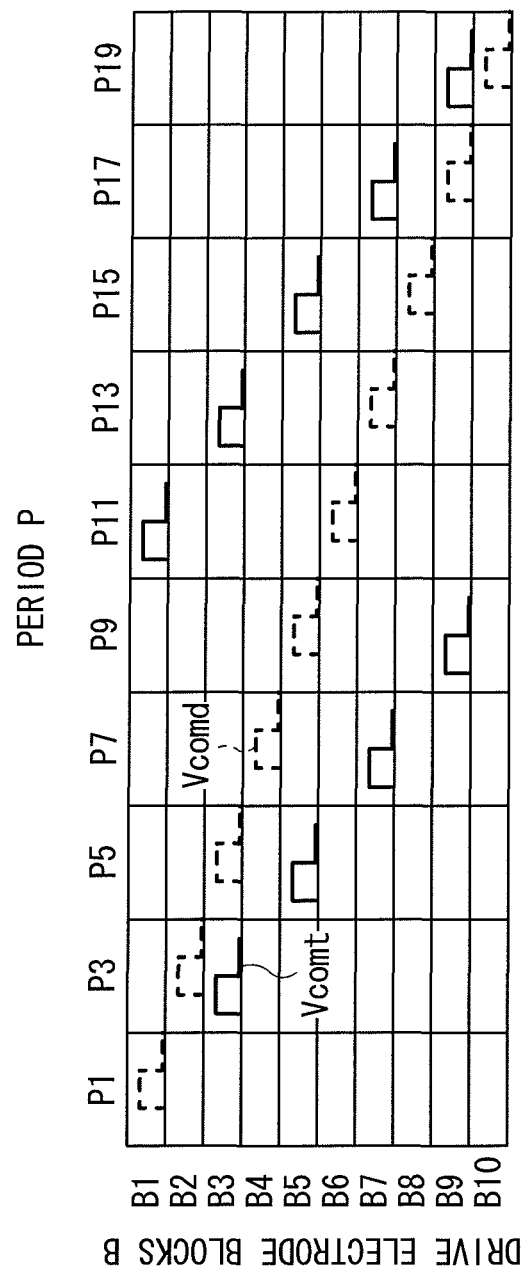
FIG. 10 is an explanatory diagram illustrating the relation of timings of a display drive signal and a touch detection drive signal according to the first embodiment.

FIG. 10 illustrates the relation of relative timings between the display drive signal Vcomd and the touch detection drive signal Vcomt. The lateral axis indicates period P, and the vertical axis indicates the drive electrode blocks B to which the display drive signal Vcomd and the touch detection drive signal Vcomt are applied.

In the period P1, the drive electrode driver 14 applies the rectangular-shaped display drive signal Vcomd to the drive electrode block B1. In the periods P2 to P19, the drive electrode driver 14 sequentially selects the drive electrode blocks B, and applies the display drive signal Vcomd and the touch detection drive signal Vcomt to different drive electrode blocks B in each period P. The touch detection drive signal Vcomt has a waveform similar to that of the display drive signal Vcomd, and the phase of the touch detection drive signal Vcomt is advanced more than that of the display drive signal Vcomd. Desirably, the amplitude of the display drive signal Vcomd and that of the touch detection signal Vcomt are the same for the reason that a circuit, a wiring, a power source, and the like are shared, although it is not limited thereto. For example, in the case where the amplitude of the touch detection signal Vcomt is larger than that of the display drive signal Vcomd, the sensitivity of touch detection is improved. In the period P20, although not illustrated, the drive electrode driver 14 applies the rectangular-shaped display drive signal Vcomd to the drive electrode block B10 like in the period P1.

(Detailed Operation of Display Device 1 with Touch Detecting Function)

Next, the detailed operation of the display device 1 with a touch detecting function will be described with reference to some timing waveform charts.

Figure 11:
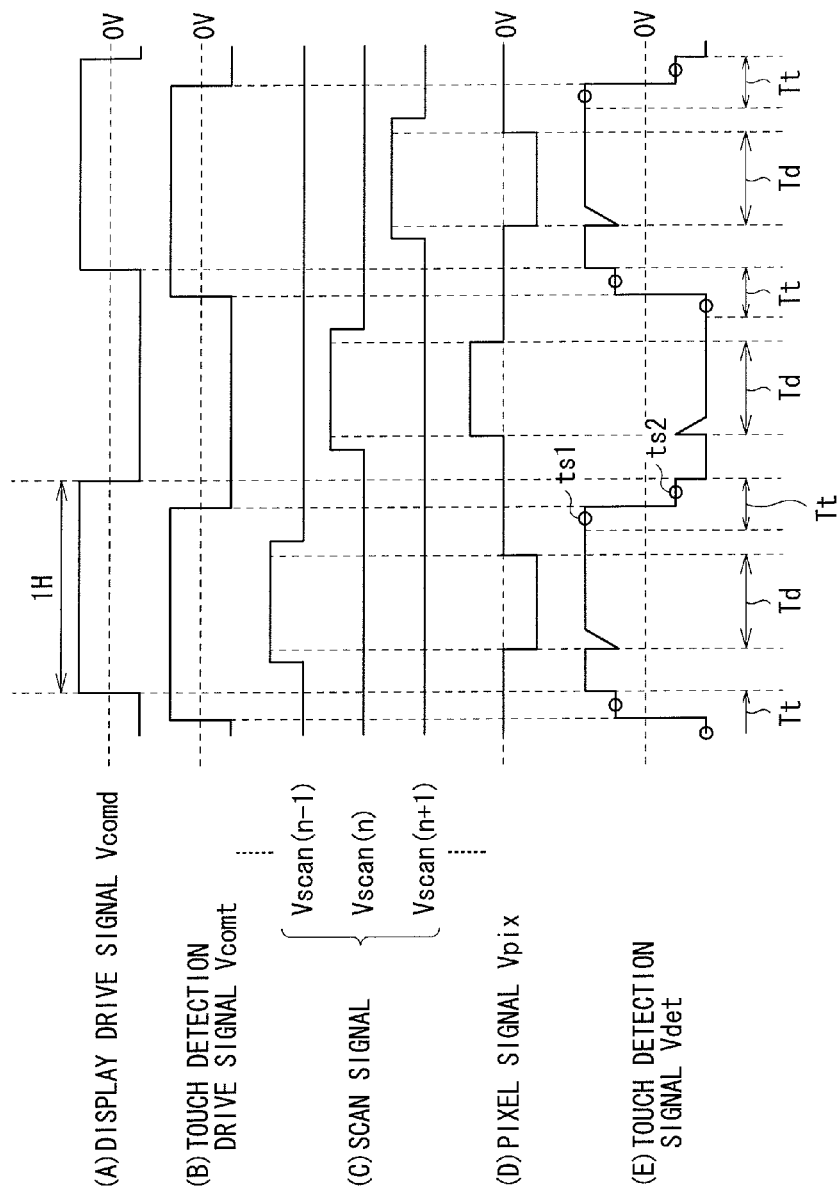
FIG. 11 is a timing waveform chart showing an operation example of the display device with the touch detecting function according to the first embodiment.

FIG. 11 illustrates an example of timing waveforms of the display device 1 with a touch detecting function, in the periods P2 to P19. (A) illustrates the waveform of the display drive signal Vcomd, (B) illustrates the waveform of the touch detection drive signal Vcomt, (C) illustrates the waveform of the scan signal Vscan, (D) shows the waveform of the pixel signal Vpix, and (E) shows the waveform of the touch detection signal Vdet. In the periods P2 to P19, the display drive signal Vcomd ((A) of FIG. 11) and the touch detection drive signal Vcom ((B) of FIG. 11) are applied to the different drive electrode blocks B as illustrated in FIGS. 8 and 10. For convenience of explanation, (A) to (E) of FIG. 11 illustrate the operations in one period P of the periods P2 to P19. That is, in the explanation of (A) to (E) of FIG. 11, it is assumed that the drive electrode blocks Bd and Bt do not move.

The display unit 10 with the touch detecting function performs a touch detecting operation (touch detection period Tt) and a display operation (display period Td) in a time-divisional manner. In the periods P2 to P19, in the touch detecting operation, when the touch detection drive signal Vcomt changes and the display drive signal Vcomd does not change, the touch detection is performed on the basis of the touch detection signal output from the touch detection electrode TDL. In the following, the operation will be described in detail.

First, the drive electrode driver 14 selects the drive electrode block Bd and applies the display drive signal Vcomd to that drive electrode block Bd, and the voltage level changes from the low level to the high level ((A) in FIG. 11). By the change, a one display horizontal period (1H) starts. The display drive signal Vcomd is transmitted to the touch detection electrode TDL like the above-described touch detection drive signal Vcomt, and the touch detection signal Vdet changes ((E) in FIG. 11).

Then, the gate driver 12 applies the scan signal Vscan to the scan signal line GCL of pixels in the (n−1)th row included in the drive electrode block Bd selected by the drive electrode driver 14, and a scan signal Vscan(n−1) changes from the low level to the high level ((C) in FIG. 11).

Then, in the display period Td, the source driver 13 applies the pixel signal Vpix to the pixel signal line SGL ((D) in FIG. 11) to perform display of the 1 horizontal line. As illustrated in (E) in FIG. 11, there is the possibility that the change in the pixel signal Vpix is transmitted to the touch detection electrode TDL via a parasite capacitance and the touch detection signal Vdet changes. However, the A/D converter 43 does not perform sampling in the display period Td, so that the pixel signal Vpix does not exert influence on the touch detection. After supply of the pixel signal Vpix of the source driver 13 is finished, the gate driver 12 changes the level of a scan signal Vscan(n−1) of the scan signal line GCL of the (n−1)th row from the high level to the low level ((C) in FIG. 11).

Next, the touch detection period Tt starts. The A/D converter 43 A-D converts the touch detection signal Vdet at a sampling timing ts1 of the touch detection period Tt ((E) in FIG. 11).

Then, the drive electrode driver 14 applies the touch detection drive signal Vcomt to the drive electrode block Bt, and the voltage level changes from the high level to the low level ((B) in FIG. 11). The touch detection drive signal Vcomt is transmitted to the touch detection electrode TDL via an electrostatic capacitance, and the touch detection signal Vdet changes ((E) in FIG. 11).

Then, the A/D converter 43 A-D converts the touch detection signal Vdet at a sampling timing ts2 ((E) in FIG. 11). In the signal processor 44 of the touch detection circuit 40, touch detection is performed on the basis of the difference between an A/D conversion result at the sampling timing ts1 and an A/D conversion result at the sampling timing ts2. In such a manner, in the display device 1 with the touch detecting function, touch detection of one detection block corresponding to the drive electrode block Bt is performed.

Then, the drive electrode driver 14 applies the display drive signal Vcomd to the drive electrode block Bd ((A) in FIG. 11). After that, the gate driver 12 applies the scan signal Vscan to the scan signal line GCL of pixels in the n-th row included in the drive electrode block Bd, and a scan signal Vscan(n) changes from the low level to the high level ((A) in FIG. 11).

Then, in the display period Td, the source driver 13 applies the pixel signal Vpix to the pixel signal line SGL ((D) in FIG. 11) to start displaying for one horizontal line. Although the display device 1 with the touch detecting function performs inversion drive in this example, the polarity of the pixel signal Vpix applied by the source driver 13 is inverted from that of the pixel signal Vpix in the immediately preceding 1 display horizontal period. After completion of the supply of the pixel signal Vpix by the source driver 13, the gate driver 12 changes a scan signal Vscan(n) in the scan signal line GCL in the n-th row from the high level to the low level.

Then, at the sampling timing ts1 in the touch detection period Tt, the A/D converter 43 A/D converts the touch detection signal Vdet ((E) in FIG. 11). The drive electrode driver 14 applies the touch detection drive signal Vcomt to the drive electrode block Bt ((B) in FIG. 11). After the touch detection signal Vdet changes ((E) in FIG. 11), the A/D converter 43 A/D converts the touch detection signal Vdet at the sampling timing ts2 ((E) in FIG. 11). In the signal processor 44 in the touch detection circuit 40, touch detection is performed on the basis of the difference between the A/D conversion result at the sampling timing ts1 and the A/D conversion result at the sampling timing ts2.

By repeating the above-described operations hereinafter, the display device 1 with the touch detecting function performs the display operation by performing the scanning in the drive electrode block Bd selected in each period P of the periods P2 to P19 and performs the touch detecting operation on one detection block related to the selected drive electrode block Bt. The operations are repeated in all of the periods P2 to P19.

Figure 12:
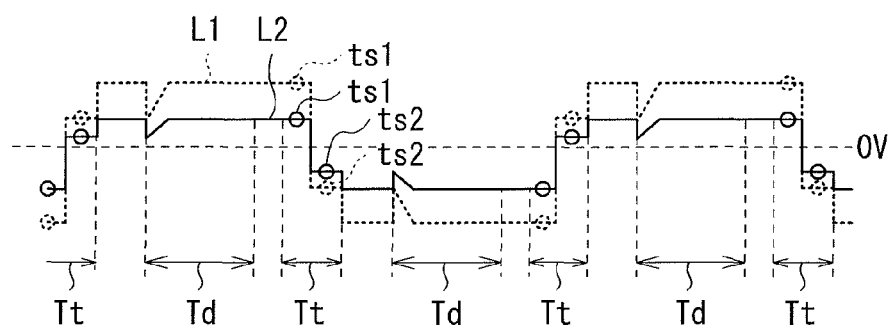
FIG. 12 is a waveform chart illustrating an example of the waveform of the touch detection signal according to the first embodiment.

FIG. 12 illustrates the waveforms of the touch detection signal Vdet in the periods P2 to P19. In FIG. 12, the waveform L1 is the waveform of the touch detection signal Vdet in the case where there is no touch. The waveform L2 is the waveform of the touch detection signal Vdet in the case where there is a touch. In the display device 1 with the touch detecting function, the amplitude of the touch detection signal Vdet varies depending on the presence or absence of a touch on the basis of the basic principle of the above-described capacitive touch detection. That is, the amplitude of the touch detection signal Vdet in the case where there is a touch is smaller than that in the case where there is no touch. The touch detection circuit 40 detects the difference of the amplitudes by sampling the touch detection signal Vdet at the sampling timings is 1 and ts2 in the touch detection period, thereby detecting the touch.

Figure 13:
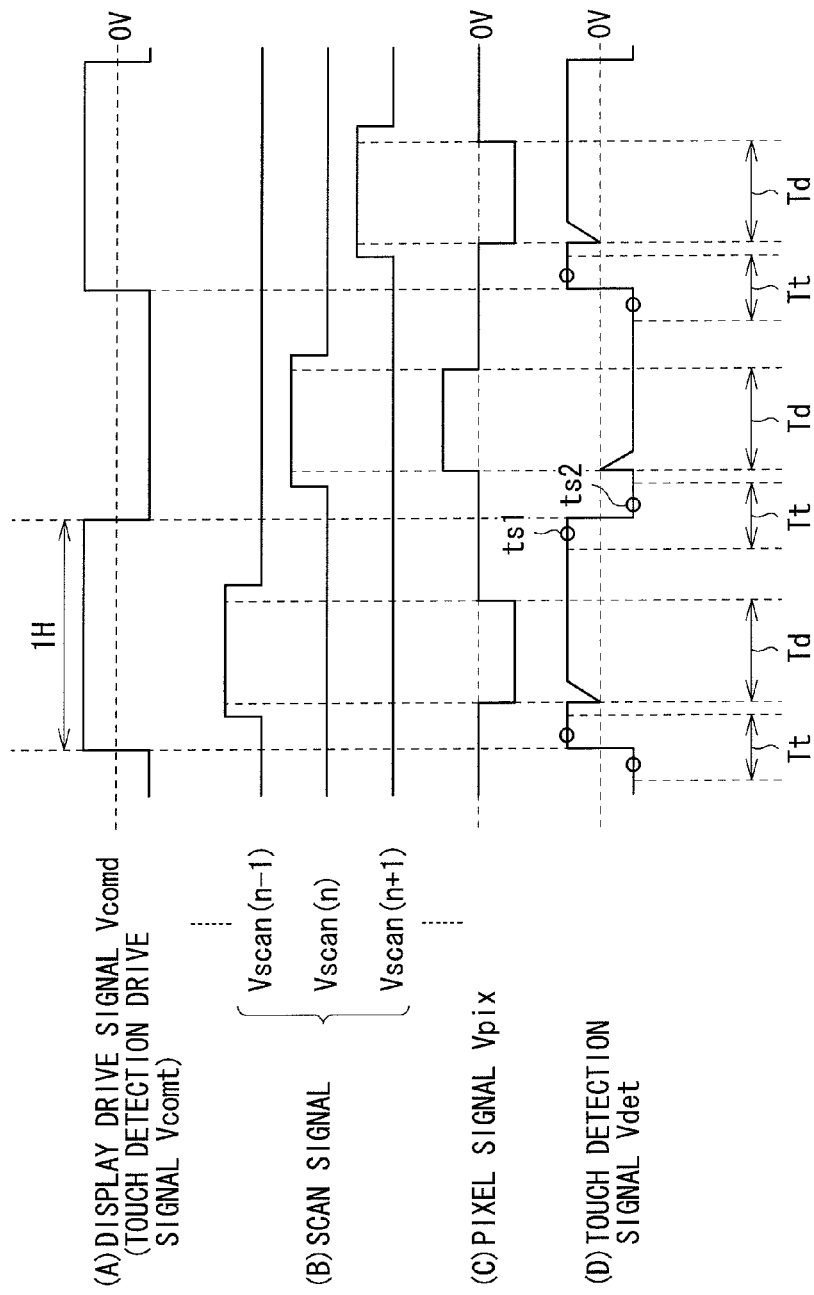
FIG. 13 is a timing waveform chart illustrating another operation example of the display device with the touch detecting function according to the first embodiment.

FIG. 13 illustrates an example of timing waveforms of the display device 1 with a touch detecting function, in the periods P1 and P20. (A) illustrates the waveform of the display drive signal Vcomd, (B) illustrates the waveform of the scan signal Vscan, (C) shows the waveform of the pixel signal Vpix, and (D) shows the waveform of the touch detection signal Vdet. In the periods P1 and P20, as described above, the drive electrode driver 14 does not output the touch detection drive signal Vcomt, and the touch detecting operation is performed on the basis of the display drive signal Vcomd ((A) in FIG. 13). In other words, in the periods P1 and P20, the display drive signal Vcomd is also used as the touch detection drive signal Vcomt. For convenience of explanation, it is assumed that (A) to (D) in FIG. 13 show the operations in one of the periods P1 and P20. That is, in the explanation of (A) to (D) of FIG. 13, it is assumed that the drive electrode blocks Bd and Bt do not move.

The display device 1 with the touch detecting function performs a touch detecting operation (touch detection period Tt) and a display operation (display period Td) in a time-divisional manner. In the periods P1 and P20, in the touch detecting operation, when the display drive signal Vcomd changes, the touch detection is performed on the basis of the touch detection signal output from the touch detection electrode TDL. In the following, the operation will be described in detail.

First, the drive electrode driver 14 selects the drive electrode block Bd and applies the display drive signal Vcomd to that drive electrode block Bd, and the voltage level changes from the low level to the high level ((A) in FIG. 13). By the change, a one display horizontal period (1H) starts.

Then, the gate driver 12 applies the scan signal Vscan to the scan signal line GCL of pixels in the (n−1)th row included in the drive electrode block Bd selected by the drive electrode driver 14, and a scan signal Vscan(n−1) changes from the low level to the high level ((B) in FIG. 13).

Then, in the display period Td, the source driver 13 applies the pixel signal Vpix to the pixel signal line SGL ((C) in FIG. 13) to start display of the 1 horizontal line. After completion of the supply of the pixel signal Vpix of the source driver 13, the gate driver 12 changes the level of the scan signal Vscan(n−1) of the scan signal line GCL of the (n−1)th row from the high level to the low level ((B) in FIG. 13).

Next, the touch detection period Tt starts. The A/D converter 43 A-D converts the touch detection signal Vdet at the sampling timing ts1 of the touch detection period Tt ((D) in FIG. 13).

Then, the drive electrode driver 14 applies the display drive signal Vcomd to the drive electrode block Bd, and the voltage level changes from the high level to the low level ((A) in FIG. 13). The display drive signal Vcomd is transmitted to the touch detection electrode TDL via an electrostatic capacitance, and the touch detection signal Vdet changes ((D) in FIG. 13).

Then, the A/D converter 43 A-D converts the touch detection signal Vdet at the sampling timing ts2 ((D) in FIG. 13). In the signal processor 44 of the touch detection circuit 40, touch detection is performed on the basis of the difference between an A/D conversion result at the sampling timing ts1 and an A/D conversion result at the sampling timing ts2. In such a manner, in the display device 1 with the touch detecting function, touch detection of one detection block corresponding to the drive electrode block Bd is performed.

Then, the gate driver 12 applies the scan signal Vscan to the scan signal line GCL of pixels in the n-th row included in the drive electrode block Bd, and the scan signal Vscan(n) changes from the low level to the high level ((B) in FIG. 13).

Then, in the display period Td, the source driver 13 applies the pixel signal Vpix to the pixel signal line SGL ((C) in FIG. 13) to start displaying for one horizontal line. After completion of the supply of the pixel signal Vpix by the source driver 13, the gate driver 12 changes the scan signal Vscan(n) in the scan signal line GCL in the n-th row from the high level to the low level ((B) in FIG. 13).

Then, at the sampling timing ts1 in the touch detection period Tt, the A/D converter 43 A/D converts the touch detection signal Vdet ((D) in FIG. 13). The drive electrode driver 14 applies the display drive signal Vcomd to the drive electrode block Bd ((A) in FIG. 13), and the touch detection signal Vdet changes ((D) in FIG. 13). After that, the A/D converter 43 A/D converts the touch detection signal Vdet at the sampling timing ts2 ((D) in FIG. 13). In the signal processor 44 in the touch detection circuit 40, touch detection is performed on the basis of the difference between the A/D conversion result at the sampling timing ts1 and the A/D conversion result at the sampling timing ts2.

By repeating the above-described operations hereinafter, the display device 1 with the touch detecting function performs the display operation by performing the scanning in the drive electrode block Bd selected in each period P of the periods P1 and P20 and performs the touch detecting operation on one detection block related to the drive electrode block Bd.

The sampling timings ts1 and ts2 in the periods P1 and P20 illustrated in FIG. 13 differ from the sampling timings ts1 and ts2 in the periods P2 to P19 illustrated in FIG. 11. That is, in FIG. 13, the sampling timings ts1 and ts2 are set before and after the change in the display drive signal Vcomd, respectively. In FIG. 11, they are set before the display drive signal Vcomd changes. Since the display device 1 with the touch detecting function always grasps the drive electrode block B (drive electrode block Bd) as an object of the display operation and the drive electrode block (drive electrode block Bt) as an object of the touch detecting operation, the sampling timings ts1 and ts2 in the operations in the periods P1 and P20 and those in the operation in the periods P2 to P19 are set different from each other, to control the touch detection circuit 40.

Figure 14:
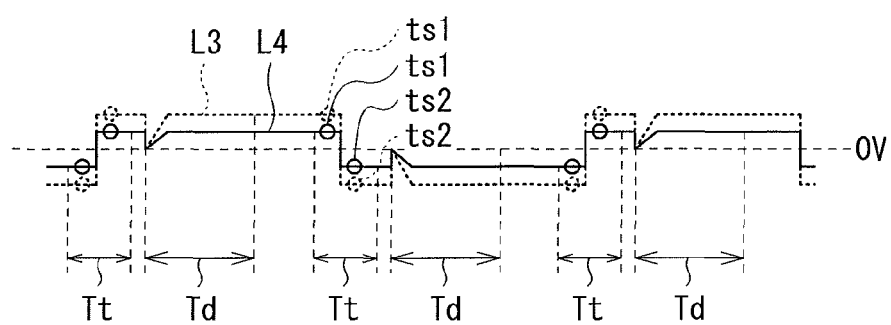
FIG. 14 is a waveform chart illustrating another waveform example of the touch detection signal according to the first embodiment.

FIG. 14 illustrates the waveforms of the touch detection signal Vdet in the periods P1 and P20. In FIG. 14, the waveform L3 is the waveform of the touch detection signal Vdet in the case where there is no touch. The waveform L4 is the waveform of the touch detection signal Vdet in the case where there is a touch. The touch detection circuit 40 detects a touch by sampling the touch detection signal Vdet at the sampling timings ts1 and ts2 of the touch detection period Tt, on the basis of the basic principle of the above-described capacitive touch detection.

In this manner, the display device 1 with the touch detecting function performs the display operation on the entire display face by performing the operations as described above in the periods P1 to P20, and performs the touch detecting operation on the entire touch detection face.

Comparative Example

Next, a display device with a touch detecting function according to a comparative example will be described. In the comparative example, the display drive signal Vcomd and the touch detection drive signal Vcomt have the same phase. That is, in the comparative example, the display device with the touch detecting function is constructed by using a drive electrode driver 14R which outputs the display drive signal Vcomd and the touch detection signal Vcomt having such a phase relation. The other configuration is similar to that of the first embodiment described above (refer to FIG. 4 and the like).

Figure 15:
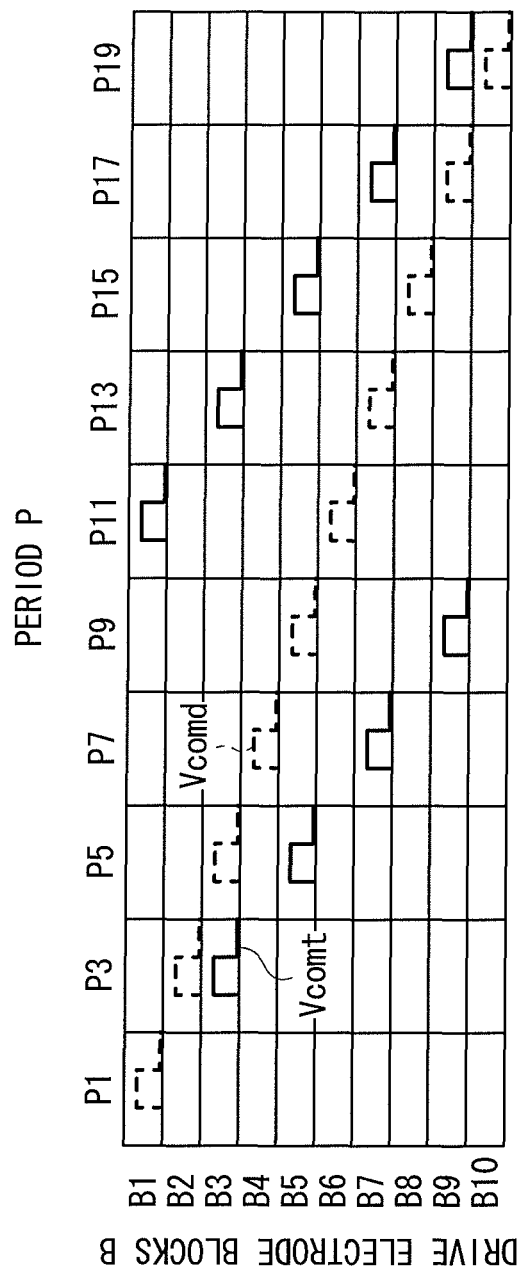
FIG. 15 is an explanatory diagram illustrating the relation of timings of a display drive signal and a touch detection drive signal in a comparative example.

FIG. 15 illustrates relative timing relations between the display drive signal Vcomd and the touch detection drive signal Vcomt in the display device with the touch detecting function according to the comparative example. In the display device with the touch detecting function according to the comparative example, in a manner similar to the display device 1 with the touch detecting function according to the embodiment (FIG. 10), in the period P1, the drive electrode driver 14R applies the display drive signal Vcomd having a rectangular shape to the drive electrode block B1. In the periods P2 to P19, the drive electrode driver 14R sequentially selects the drive electrode blocks B and applies the display drive signal Vcomd and the touch detection drive signal Vcomt to the different drive electrode blocks B in the periods P, respectively. At this time, in the display device with the touch detecting function according to the comparative example, different from the display device 1 with the touch detecting function according to the embodiment, the touch detection drive signal Vcomt has the same phase as that of the display drive signal Vcomd. In the period P20, although not shown, like in the period P1, the drive electrode driver 14R applies the display drive signal Vcomd having a rectangular shape to the drive electrode block B1.

Figure 16:
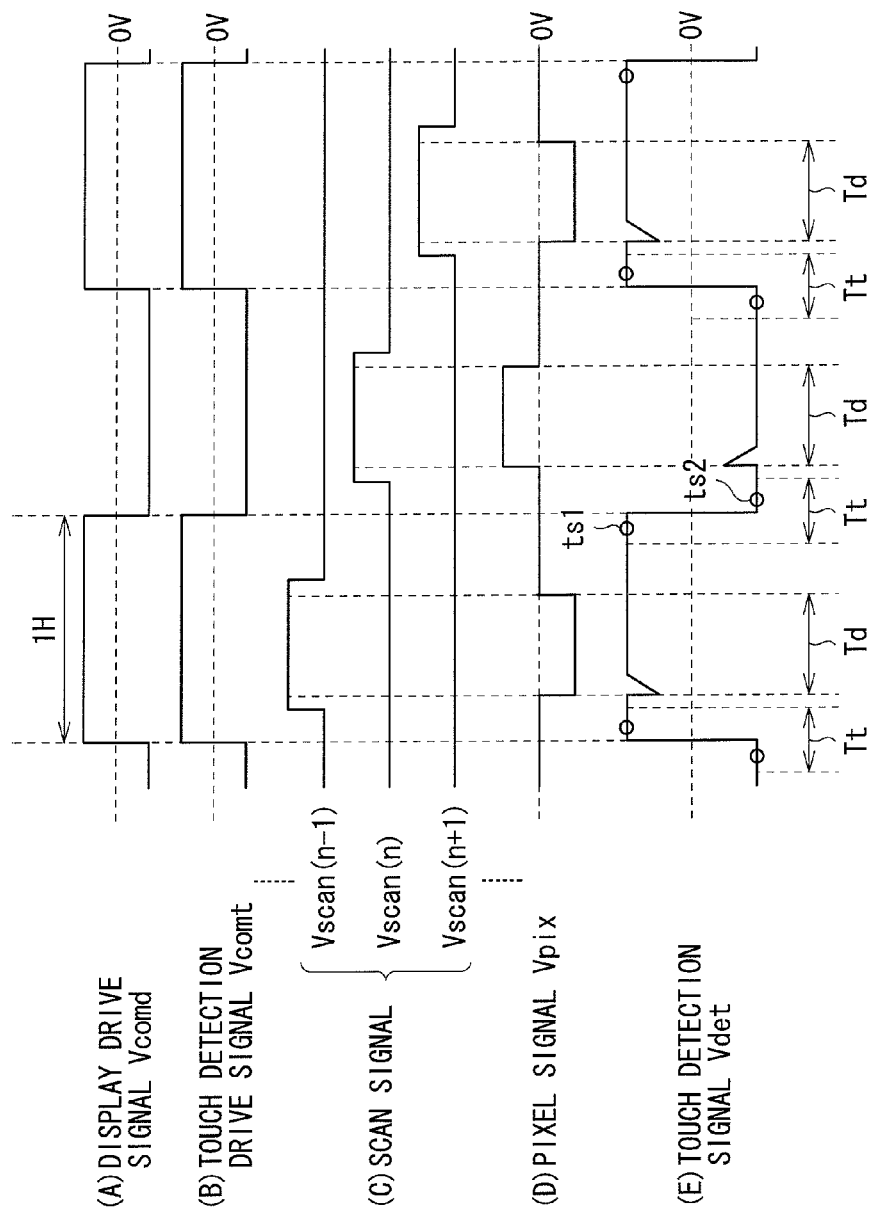
FIG. 16 is a timing waveform chart illustrating an operation example of a display device with a touch detecting function according to the comparative example.

FIG. 16 illustrates an example of timing waveforms of the display device with the touch detecting function according to the comparative example, in the periods P2 to P19. (A) illustrates the waveform of the display drive signal Vcomd, (B) illustrates the waveform of the touch detection drive signal Vcomt, (C) illustrates the waveform of the scan signal Vscan, (D) shows the waveform of the pixel signal Vpix, and (E) shows the waveform of the touch detection signal Vdet.

First, the drive electrode driver 14R selects the drive electrode block Bd and applies the display drive signal Vcomd to that drive electrode block Bd, and the voltage level changes from the low level to the high level ((A) in FIG. 16). Simultaneously, the drive electrode driver 14R selects the drive electrode block Bt and applies the touch detection drive signal Vcomt to the selected drive electrode block Bt, and the voltage level changes from the low level to the high level ((B) in FIG. 16). By the change, a one display horizontal period (1H) starts.

Then, the gate driver 12 applies the scan signal Vscan to the scan signal line GCL of pixels in the (n−1)th row included in the drive electrode block Bd, and a scan signal Vscan(n−1) changes from the low level to the high level ((C) in FIG. 16).

Then, in the display period Td, the source driver 13 applies the pixel signal Vpix to the pixel signal line SGL ((D) in FIG. 16) to perform display of the 1 horizontal line. After supply of the pixel signal Vpix of the source driver 13 is finished, the gate driver 12 changes the level of the scan signal Vscan(n−1) of the scan signal line GCL of the (n−1)th row from the high level to the low level ((C) in FIG. 16).

Then, the A/D converter 43 A-D converts the touch detection signal Vdet at the sampling timing ts1 of the touch detection period Tt ((E) in FIG. 16). The drive electrode driver 14 applies the display drive signal Vcomd to the drive electrode block Bd ((A) in FIG. 16) and applies the touch detection drive signal Vcomt to the drive electrode block Bt ((B) in FIG. 16), and the touch detection signal Vdet changes ((E) in FIG. 16). After that, the A/D converter 43 A-D converts the touch detection signal Vdet at the sampling timing ts2 ((E) in FIG. 16). In the signal processor 44 of the touch detection circuit 40, touch detection is performed on the basis of the difference between an A/D conversion result at the sampling timing ts1 and an A/D conversion result at the sampling timing ts2.

By repeating the above-described operations hereinafter while performing the inverting operation, the display device with the touch detecting function according to the comparative example performs the display operation by performing the scanning in the drive electrode block Bd selected in each period P of the periods P2 to P19 and performs the touch detecting operation on two detection blocks related to the selected drive electrode blocks Bd and Bt. The operations are performed in each period P of the periods P1 and P20 in a manner similar to the foregoing embodiment (FIG. 13).

In the comparative example, in each period P of the periods P2 to P19, the touch detection drive signal Vcomt and the display drive signal Vcomd have the same phase, so that the touch detecting operation is performed simultaneously on the two detection blocks. That is, in the comparative example, as illustrated in FIG. 8, the touch detecting operation is performed simultaneously on the different drive electrode blocks Bd and Bt which are selected in each period P of the periods P2 to P19. At this time, in the period P11, a touch component appears in the touch detection signal Vdet regardless of a touch which occurs in any of the drive electrode block B1 (the drive electrode block Bt) and the drive electrode block B6 (the drive electrode block Bd), for example. This shows that it is difficult to determined as to whether the touch is occurred in the drive electrode block B1 (the drive electrode block Bt) or in the drive electrode block B6 (the drive electrode block Bd). That is, in the display device with the touch detecting function according to the comparative example, there is the possibility that detection of the touch position is not accurately detected. In other words, in addition to a desired signal component based on the touch detecting drive (the drive electrode block Bt), a signal component based on the display drive (the drive electrode block Bd) appears as display noise in the touch detection signal Vdet.

On the other hand, in the embodiment, in each period P of the periods P2 to P19, the phase of the touch detection drive signal Vcomt is advanced as compared with that of the display drive signal Vcomd. Consequently, the touch detecting operation is performed on one detection block related to the selected drive electrode block Bt. For example, in FIG. 8, in the period P11, a touch component appears in the touch detection signal Vdet only when a touch occurs in the drive electrode block B1 (the drive electrode block Bt). Consequently, in the display device 1 with the touch detecting function in the embodiment, the touch position can be detected accurately without being influenced by the display noise.

(Effect)

In the embodiment as described above, the phase of the touch detection drive signal and that of the display drive signal are deviated or staggered from each other, so that the touch detection signal according to the touch detection drive signal is separated, and the influence of the display operation of the touch detecting operation is suppressed to the minimum.

(Modification 1-1)

In the first embodiment described above, in the periods P2 to P19, the phase of the touch detection drive signal Vcomt is made advance more than that of the display drive signal Vcomd, although it is not limited thereto. Instead, for example, the phase of the touch detection drive signal Vcomt may be made retard from that of the display drive signal Vcomd. This example will be described in detail below.

Figure 17:
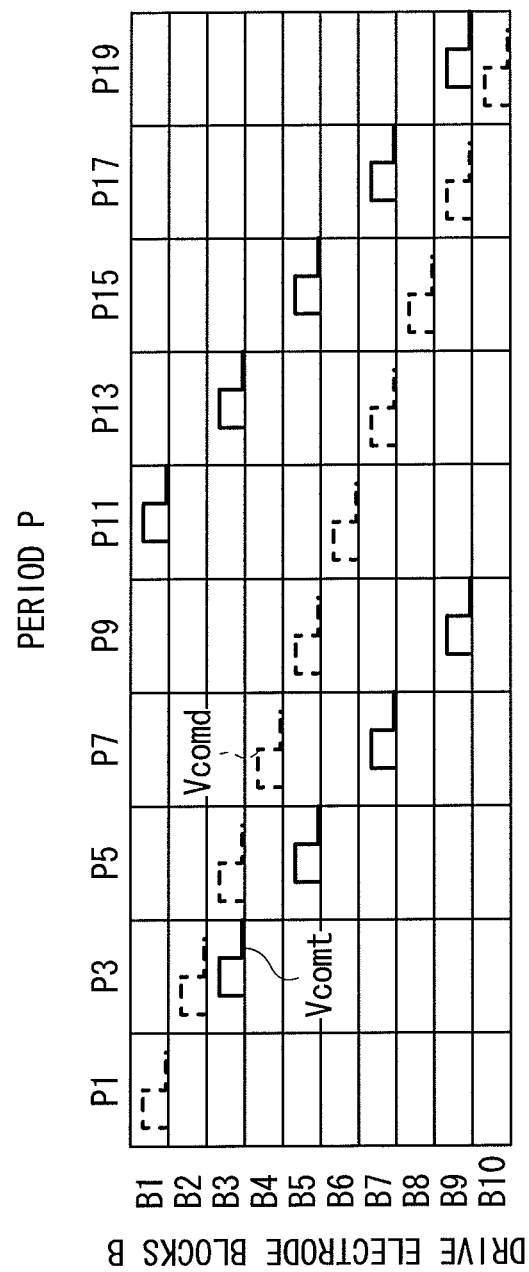
FIG. 17 is an explanatory diagram illustrating the relation of timings of a display drive signal and a touch detection drive signal according to another modification of the first embodiment.

FIG. 17 illustrates relative timing relations between the display drive signal Vcomd and the touch detection drive signal Vcomt in a display device with a touch detecting function according to the modification. Different from the case of the display device 1 with the touch detecting function according to the embodiment (FIG. 10), in the periods P2 to P19, the phase of the touch detection drive signal Vcomt is behind that of the display drive signal Vcomd.

Figure 18:
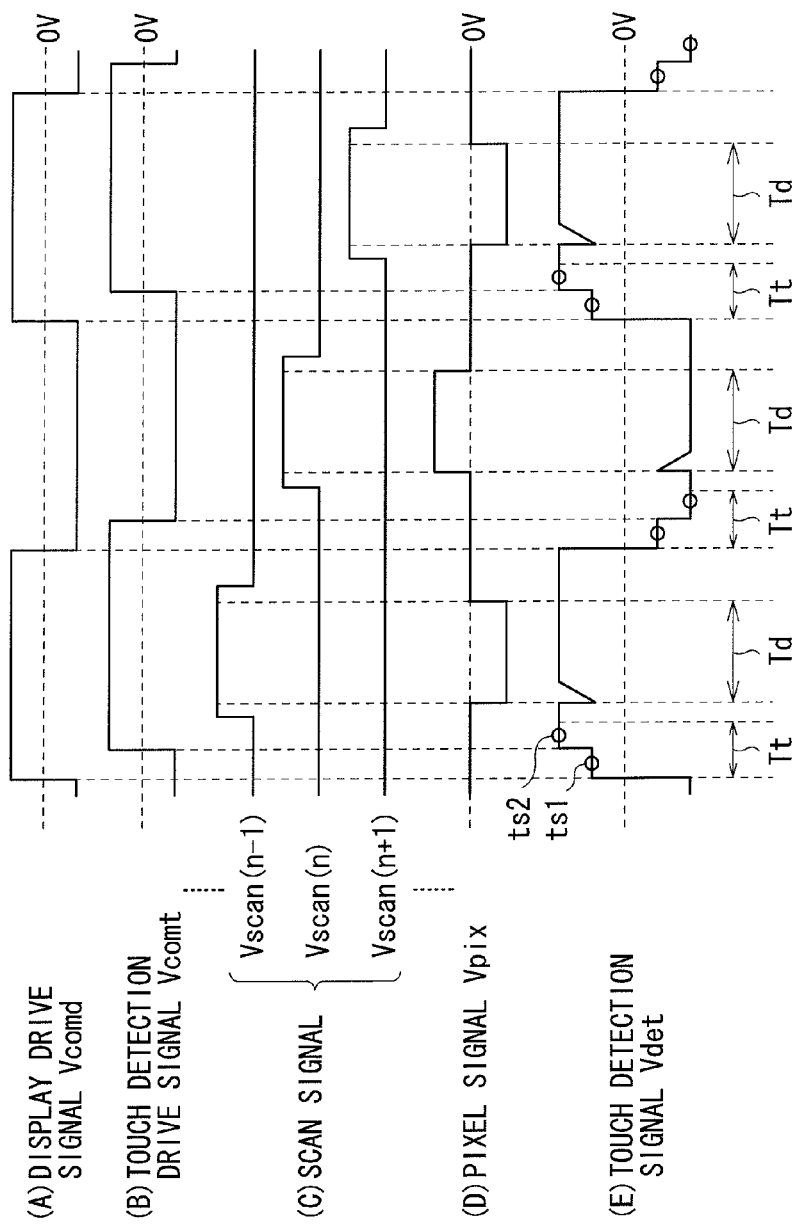
FIG. 18 is a timing waveform chart illustrating an operation example of a display device with the touch detecting function according to another modification of the first embodiment.

FIG. 18 illustrates an example of timing waveforms of the display device with the touch detecting function according to the modification, in the periods P2 to P19. (A) illustrates the waveform of the display drive signal Vcomd, (B) illustrates the waveform of the touch detection drive signal Vcomt, (C) illustrates the waveform of the scan signal Vscan, (D) shows the waveform of the pixel signal Vpix, and (E) shows the waveform of the touch detection signal Vdet.

First, the drive electrode driver 14 selects the drive electrode block Bd and applies the display drive signal Vcomd to that drive electrode block Bd, and the voltage level changes from the low level to the high level ((A) in FIG. 18). By the change, a one display horizontal period (1H) starts, and the touch detection period Tt starts. The display drive signal Vcomd is transmitted to the touch detection electrode TDL via an electrostatic capacitance, and the touch detection signal Vdet changes ((E) in FIG. 18).

Then, the A/D converter 43 A-D converts the touch detection signal Vdet at the sampling timing ts1 of the touch detection period Tt ((E) in FIG. 18).

Then, the drive electrode driver 14 selects the drive electrode block Bt and applies the touch detection drive signal Vcomt to that drive electrode block Bt, and the voltage level thereof changes from the low level to the high level ((B) in FIG. 18). The touch detection drive signal Vcomt is transmitted to the touch detection electrode TDL via the electrostatic capacitance, and the touch detection signal Vdet changes ((E) in FIG. 18).

Then, the A/D converter 43 A-D converts the touch detection signal Vdet at the sampling timing ts2 in the touch detection period Tt ((E) in FIG. 18). In the signal processor 44 of the touch detection circuit 40, touch detection is performed on the basis of the difference between an A/D conversion result at the sampling timing ts1 and an A/D conversion result at the sampling timing ts2.

Then, the gate driver 12 applies the scan signal Vscan to the scan signal line GCL of pixels in the (n−1)th row included in the drive electrode block Bd selected by the drive electrode driver 14, and a scan signal Vscan(n−1) changes from the low level to the high level ((C) in FIG. 18).

Then, in the display period Td, the source driver 13 applies the pixel signal Vpix to the pixel signal line SGL ((D) in FIG. 18) to perform displaying for one horizontal line. After completion of the supply of the pixel signal Vpix by the source driver 13, the gate driver 12 changes the scan signal Vscan(n−1) in the scan signal line GCL in the (n−1)th row from the high level to the low level ((C) in FIG. 18).

By repeating the above-described operations hereinafter while performing the inverting operation, the display device with the touch detecting function according to the modification performs the display operation by performing the scanning in the drive electrode block Bd in each period P of the periods P2 to P19 and performs the touch detecting operation on one detection block related to the selected drive electrode block Bt. The operations are repeated in all of the periods P2 to P19.

(Modification 1-2)

Figure 19:
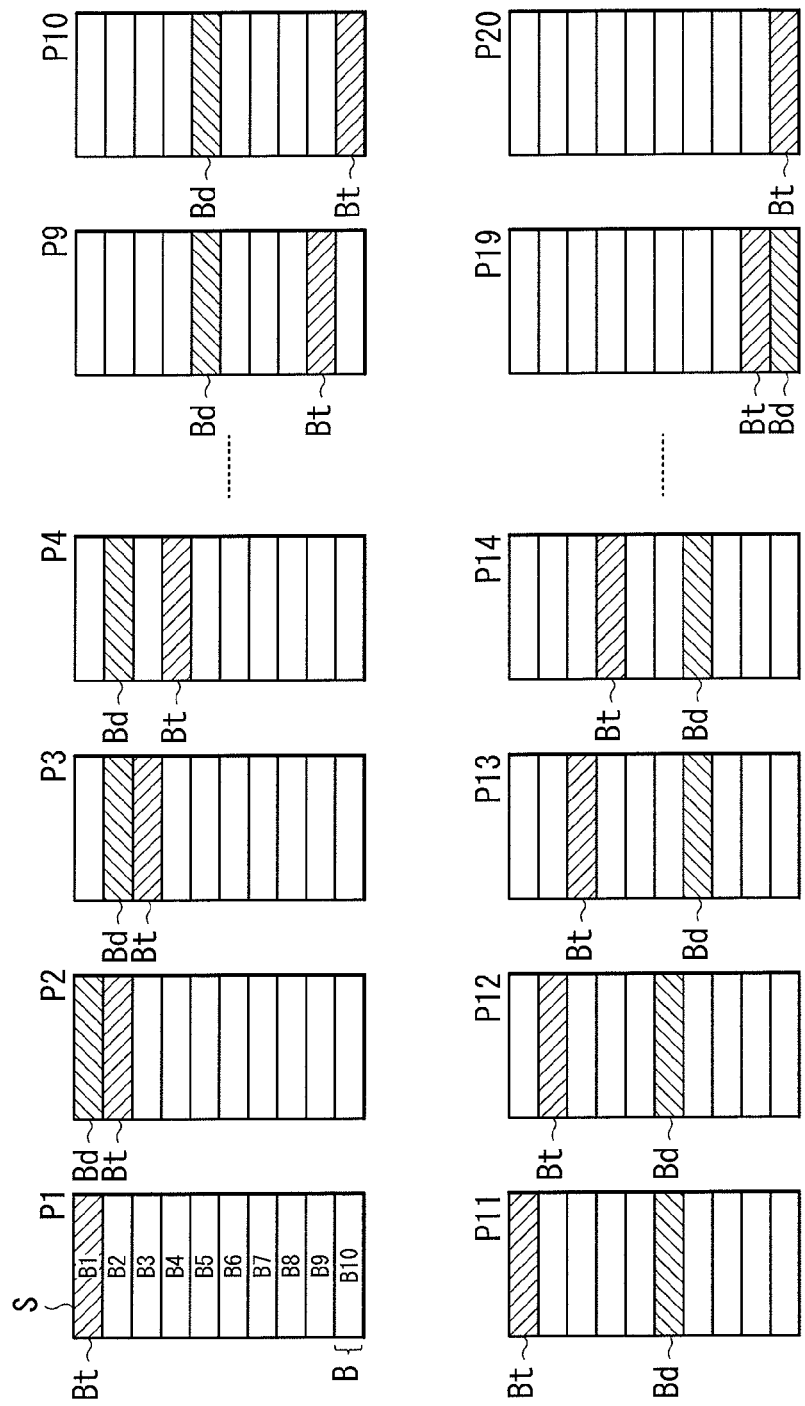
FIG. 19 is a schematic diagram illustrating an example of the operation of a drive electrode driver according to another modification of the first embodiment.
Figure 20:
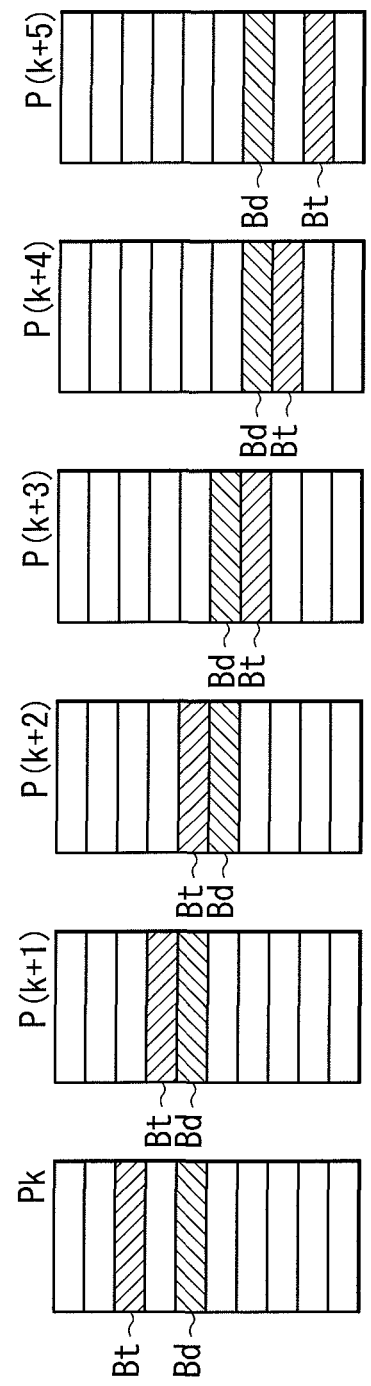
FIG. 20 is a schematic diagram illustrating an example of the operation of the drive electrode driver according to another modification of the first embodiment.

In the foregoing embodiment, when the drive electrode block B as an object of the display operation and the drive electrode block B as an object of the touch detecting operation become the same (periods P1 and 20), the drive electrode driver 14 applies the display drive signal Vcomd to that drive electrode driver B, although it is not limited thereto. Alternatively, the touch detection drive signal Vcomt may be applied. FIG. 19 schematically illustrates an operation example of the drive electrode driver 14 according to this modification. In the period P1, the drive electrode driver 14 selects the drive electrode block B1 as the drive electrode block Bt and applies the touch detection drive signal Vcomt. Similarly, in the period P20, the drive electrode driver 14 selects the drive electrode block B10 as the drive electrode block Bt, and applies the touch detection drive signal Vcomt. In this case, it is possible to allow the sampling timing is to be the same between the operation in the periods P1, P2 and the operation in the periods P2 to P19.

(Modification 1-3)

In the foregoing embodiment, in some times, the drive electrode block B as an object of the display operation and the drive electrode block B as an object of the touch detecting operation are the same, although it is not limited thereto. Alternatively, the drive electrode block B as an object of the display operation and the drive electrode block B as an object of the touch detecting operation may be always different from each other. In this case, a display device with a touch detecting function always operates like in the timing waveform chart of FIG. 11 according to the embodiment described above. That is, the display device does not operate in the timing waveform chart of FIG. 13, so that the operation is simpler.

A concrete example thereof includes a method of setting the scan frequency of the touch detecting operation and the scan frequency of the display operation to be the same. In this case, the drive electrode block Bd as an object of the display operation and the drive electrode block Bt as an object of the touch detecting operation move while maintaining the relative interval therebetween without approaching each other or separating from each other, so that they operate always differently from each other.

Another concrete example includes a method of, for example, when the drive electrode block B as an object of the display operation and the drive electrode block B as an object of the touch detecting operation are likely to be the same in the case where the scan frequency of the touch detecting operation is higher than that of the display operation like in the embodiment, making a scan of the touch detecting operation performed ahead of a scan of the display operation. In this case, with respect to the drive electrode block B which is scanned first (i.e., performed ahead), the touch detecting operation is not performed. The modification is applicable to the case where a relatively wide area such as a finger is touched or the case where precision of detection of a touch position is not so desired. Deterioration in precision of a touch position is minimized by performing interpolation using touch detection results in neighboring drive electrode blocks B and obtaining a touch detection result related to the drive electrode block B which is scanned first (i.e., performed ahead) in the touch detection circuit 40.

In any of the methods, the drive electrode block Bd as an object of the display operation and the drive electrode block Bt as an object of the touch detecting operation are always different from each other, so that the operation is always performed like in the timing waveform chart of FIG. 11 described in the foregoing embodiment. That is, since an operation similar to the timing waveform of FIG. 13 is not performed, the operation is simpler.

3. Second Embodiment

A display device 9 with a touch detecting function according to a second embodiment will be described. In the second embodiment, a touch detection signal Vcomt having a pulse waveform in the touch detecting period and having a DC waveform in the display period is used, and so-called dot inversion driving in which the polarities of pixel signals Vpix in pixels Pix neighboring each other are opposite to each other is performed. The configuration of the display device 9 with the touch detecting function is similar to that of the display device 1 with the touch detecting function according to the first embodiment illustrated in FIG. 4 except that a drive electrode driver is different from that of the first embodiment. In the second embodiment, the display device 9 with the touch detecting function is constructed by using a drive electrode driver 16 which outputs the touch detection drive signal Vcomt as described above. The other configuration is similar to that of the first embodiment (FIG. 4). The same reference numerals are designated to components which are substantially the same as those of the display device with the touch detecting function according to the first embodiment and their description will not be repeated.

Figure 21:
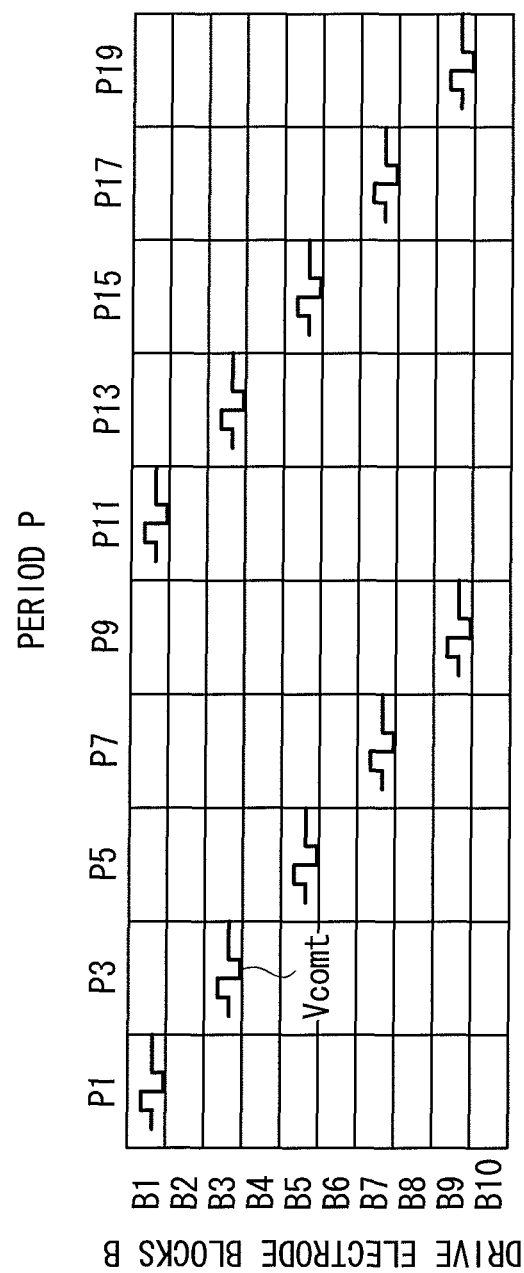
FIG. 21 is an explanatory diagram illustrating an example of the operation of a drive electrode driver according to a second embodiment.

FIG. 21 illustrates the operation of applying the pulse waveform of the touch detection drive signal Vcomt to the drive electrode block B. In the periods P1 to P20, the drive electrode driver 16 sequentially selects the drive electrode blocks B, and applies the pulse waveform of the touch detection drive signal Vcomt to the drive electrode blocks B. Although not illustrated, in the example, the voltage of the touch detection drive signal Vcomt in the display period is 0V.

In this example, the waveform of the touch detection drive signal Vcomt is a pulse waveform made of positive and negative voltages, and its time average value is 0V. Thereby, for example, the time average value of the potential difference between both ends of a liquid crystal element LC becomes 0V, so that deterioration in the liquid crystal element LC such as burning is minimized.

Figure 22:
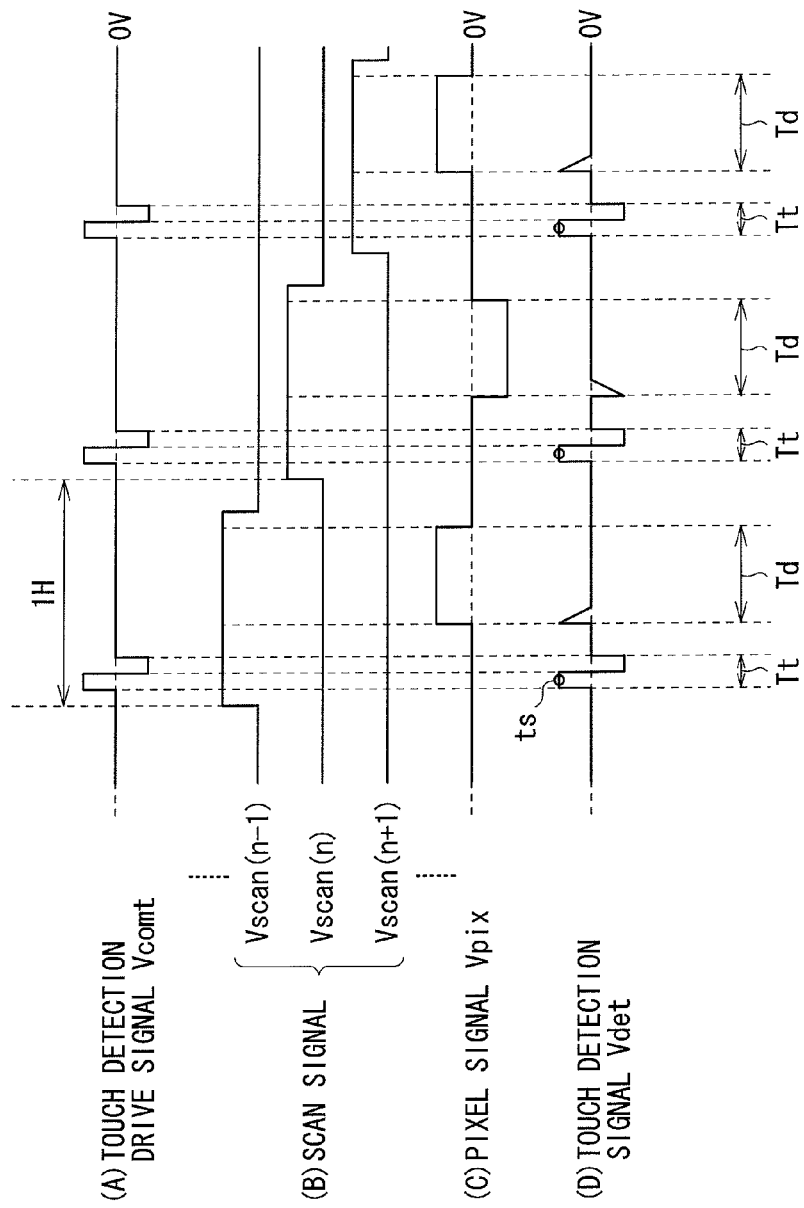
FIG. 22 is a timing waveform chart illustrating an operation example of a display device with a touch detecting function according to the second embodiment.

FIG. 22 illustrates an example of the timing waveforms of the display device 9 with the touch detecting function in the periods P1 to P20. (A) illustrates the waveform of the touch detection drive signal Vcomt, (B) illustrates the waveform of the scan signal Vscan, (C) shows the waveform of the pixel signal Vpix, and (D) shows the waveform of the touch detection signal Vdet.

First, the gate driver 12 applies the scan signal Vscan to the scan signal line GCL of pixels in the (n−1)th row, and the scan signal Vscan(n−1) changes from the low level to the high level ((B) in FIG. 22). By the operation, a one display horizontal period (1H) starts.

Then, in the touch detection period Tt, the drive electrode driver 16 selects the drive electrode block Bt, and applies the touch detection drive signal Vcomt having a pulse shape to that drive electrode block Bt ((D) in FIG. 22). The touch detection drive signal Vcomt is transmitted to the touch detection electrode TDL via an electrostatic capacitance, and the touch detection signal Vdet changes ((D) in FIG. 22).

Then, the A/D converter 43 A-D converts the touch detection signal Vdet at the sampling timing is of the touch detection period Tt, thereby detecting a touch ((D) in FIG. 22). In such a manner, in the display device 9 with a touch detecting function, a touch detection in one detection block corresponding to the drive electrode block Bt is performed.

Then, in the display period Td, the source driver 13 applies the pixel signal Vpix to the pixel signal line SGL ((C) in FIG. 22) to perform displaying for one horizontal line. After completion of the supply of the pixel signal Vpix by the source driver 13, the gate driver 12 changes the scan signal Vscan(n−1) in the scan signal line GCL in the (n−1)th row from the high level to the low level ((B) in FIG. 22) and the 1 display horizontal period is finished.

Then, the gate driver 12 applies the scan signal Vscan to the scan signal line GCL of pixels in the (n−1)th row which is different from the previously-described row, and the scan signal Vscan(n) changes from the low level to the high level ((B) in FIG. 22). By the operation, the subsequent one display horizontal period starts.

Then, in the touch detection period Tt, the drive electrode driver 16 applies the pulse-shaped touch detection drive signal Vcomt to the drive electrode block Bt ((A) in FIG. 22). The A/D driver 43 A-D converts a change in the touch detection signal Vdet accompanied thereby ((D) in FIG. 22), thereby detecting a touch in one detection block corresponding to that drive electrode block Bt.

Then, in the display period Td, the source driver 13 applies the pixel signal Vpix to the pixel signal line SGL ((C) in FIG. 22), and performs displaying for one horizontal line. In the example, the display device 9 with the touch detecting function performs dot inversion driving, so that the polarity of the pixel signal Vpix applied by the source driver 13 is inverted from that in the immediately preceding one display horizontal period. After completion of the display period Td, the one display horizontal period is finished.

By repeating the above-described operations hereinafter, the display device 9 with the touch detecting function performs the display operation by scanning the entire display face, and performs the touch detecting operation by scanning the entire touch detection face.

The touch detection signal Vdet in the touch detection period Tt is generated according to the touch detection drive signal Vcomt. Specifically, the larger the amplitude of the touch detection drive signal Vcomt is, the larger the amplitude of the touch detection signal Vdet in the touch detection period Tt is. For example, higher sensitivity of a touch panel is achieved. Thus, in the case where the amplitude of the touch detection drive signal Vcomt is made large, it is desirable to pay attention to withstand voltage and leakage of the TFT element Tr.

Figure 23:
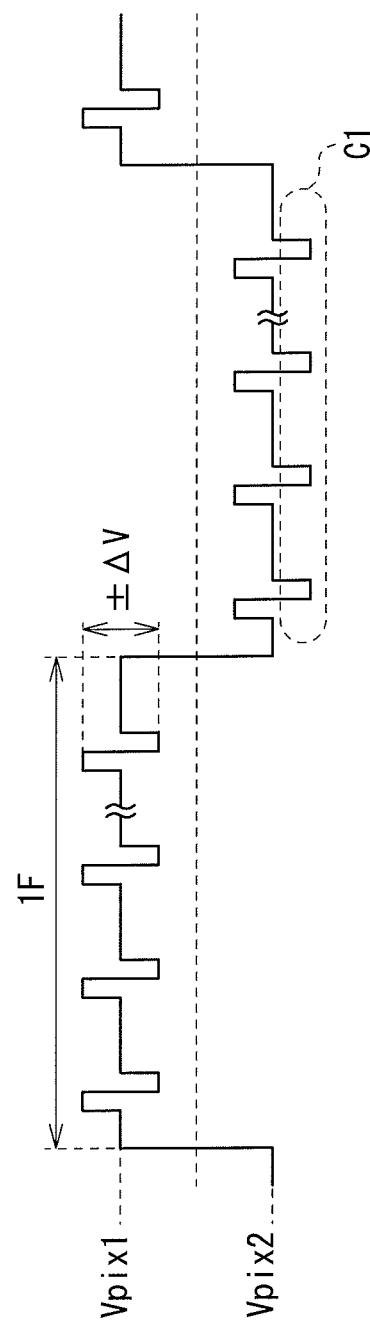
FIG. 23 is a waveform chart illustrating an operation example of the display device with the touch detecting function according to the second embodiment.

FIG. 23 illustrates the voltage waveform of the drain of the TFT element Tr. To the drain of the TFT element Tr, the pixel signal Vpix is supplied in the display operation. Then, the TFT element Tr is turned off and enters a floating state, and during one display frame period (1F), the potential of the pixel signal Vpix is maintained. In the drain of the TFT element Tr, as shown in FIG. 23, each time the touch detection drive signal Vcomt is applied to the drive electrode block B in the one display frame period, a voltage change thereof is transmitted to the liquid crystal element LC via a parasitic capacitance (not shown) existing in parallel, and the pulse waveform of the amplitude 2×ΔV corresponding to the pulse waveform of the touch detection drive signal comt is superimposed on the potential of the pixel signal Vpix. That is, for example, after the pixel signal Vpix1 is supplied, the voltage of the drain of the TFT element Tr becomes ±ΔV, and the maximum voltage becomes Vpix1+ΔV. Therefore, it is desirable that the amplitude of the pulse waveform of the touch detection drive signal Vcomt and the like be set so that the potential of the drain does not exceed the withstand voltage of the TFT element Tr.

Also, as illustrated in FIG. 23, in one display frame period in which a negative pixel signal Vpix2 is supplied, the voltage of the drain of the TFT element Tr becomes Vpix2±ΔV, and the minimum voltage becomes Vpix2−ΔV. At this time, attention is to be paid to not only the withstand voltage of the TFT element Tr but also leakage. Specifically, when a negative voltage is applied transiently to the drain of the n-type TFT element Tr which is in the off state (waveform C1) and when the TFT element Tr is turned on, charges are moved (leaked) via the TFT element Tr to change the potential of the pixel signal Vpix which is held, and there is the possibility that the quality of an image thereby deteriorates. Therefore, in this case, it is desirable that the amplitude of the pulse waveform of the touch detection drive signal Vcomt and the like be set so that the TFT element Tr does not turn on, or that the gate potential of the TFT element Tr which is in the off state be set low so as not to cause leakage.

As described above, in this embodiment, the pulse waveform of the touch detection drive signal is applied to the drive electrode only in the touch detection period which is different from the display period. Consequently, the display operation and the touch detecting operation are performed completely independent of each other, and the influence of the display operation on the touch detecting operation is minimized.

In this embodiment, the drive electrode driver outputs the pulse waveform of the touch detection drive signal only in the touch detection period, so that the amplitude of the touch detection drive signal is set without being restricted by the display operation, and the detection sensitivity is increased.

The other effects are similar to those in the case of the first embodiment.

(Modification 2-1)

Although the touch detection drive signal Vcomt has a pulse waveform made by both of positive and negative voltages in the foregoing embodiment, it is not limited thereto. Alternatively, for example, a positive pulse waveform made of positive voltage or a negative pulse waveform made of negative voltage may be used. An example of the case where the touch detection drive signal Vcomt having the positive pulse waveform will be described in detail below.

Figure 24:
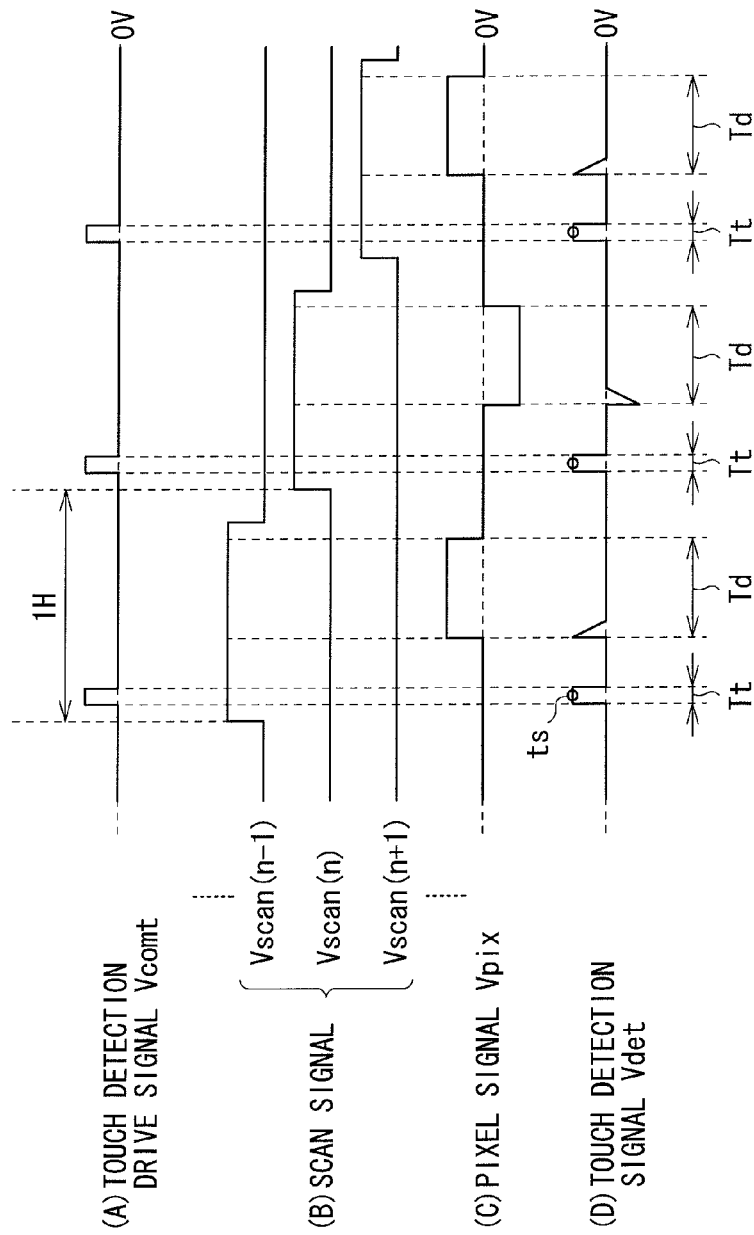
FIG. 24 is a timing waveform chart illustrating an operation example of the display device with the touch detecting function according to a modification of the second embodiment.

FIG. 24 illustrates an example of the timing waveforms of a display device with a touch detecting function according to this modification. (A) illustrates the waveform of the touch detection drive signal Vcomt, (B) illustrates the waveform of the scan signal Vscan, (C) shows the waveform of the pixel signal Vpix, and (D) shows the waveform of the touch detection signal Vdet. As illustrated in (A) in FIG. 24, the waveform of the touch detection drive signal Vcomt is a pulse waveform made of only positive voltage, unlike the case of the display device with the touch detecting function according to the embodiment described above. In this case as well, in a manner similar to the foregoing embodiment, the display operation and the touch detecting operation are performed.

Figure 25:
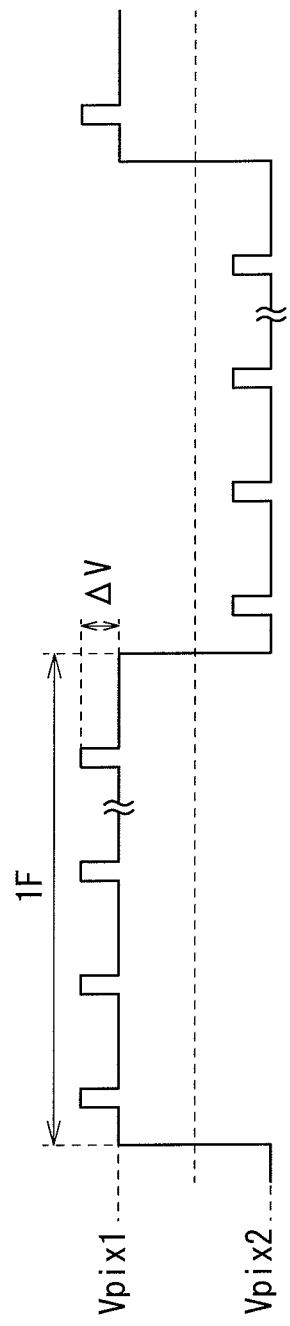
FIG. 25 is a waveform chart illustrating an operation example of the display device with the touch detecting function according to the modification of the second embodiment.

FIG. 25 illustrates the waveform at a drain terminal of the TFT element Tr in the display device with the touch detecting function according to this modification. As in the case of the display device 9 with the touch detecting function according to the foregoing embodiment (FIG. 23), the pulse waveform corresponding to the pulse waveform of the touch detection drive signal Vcomt is superimposed on the potential of the pixel signal Vpix. At that time, in correspondence with the fact that the touch detection drive signal Vcomt has the positive pulse waveform made of positive voltage, the positive pulse waveform is superimposed also on the drain terminal of the TFT element Tr. That is, for example, in one display frame period in which a negative pixel signal Vpix2 is supplied, the minimum voltage of the drain of the TFT element Tr becomes Vpix2. Consequently, the TFT element Tr is not turned on transiently, so that the potential of the pixel signal Vpix does not change. Thus, an excellent image quality is maintained.

This modification is a case where the TFT element Tr of the pixel Pix is formed by using a TFT of an n-channel MOS type. In the case of forming the TFT element Tr by using a TFT of a p-channel MOS type, the modification is applicable by using, for example, the negative pulse waveform made of negative voltage as the pulse waveform of the touch detection drive signal Vcomt.

(Modification 2-2)

Figure 26:
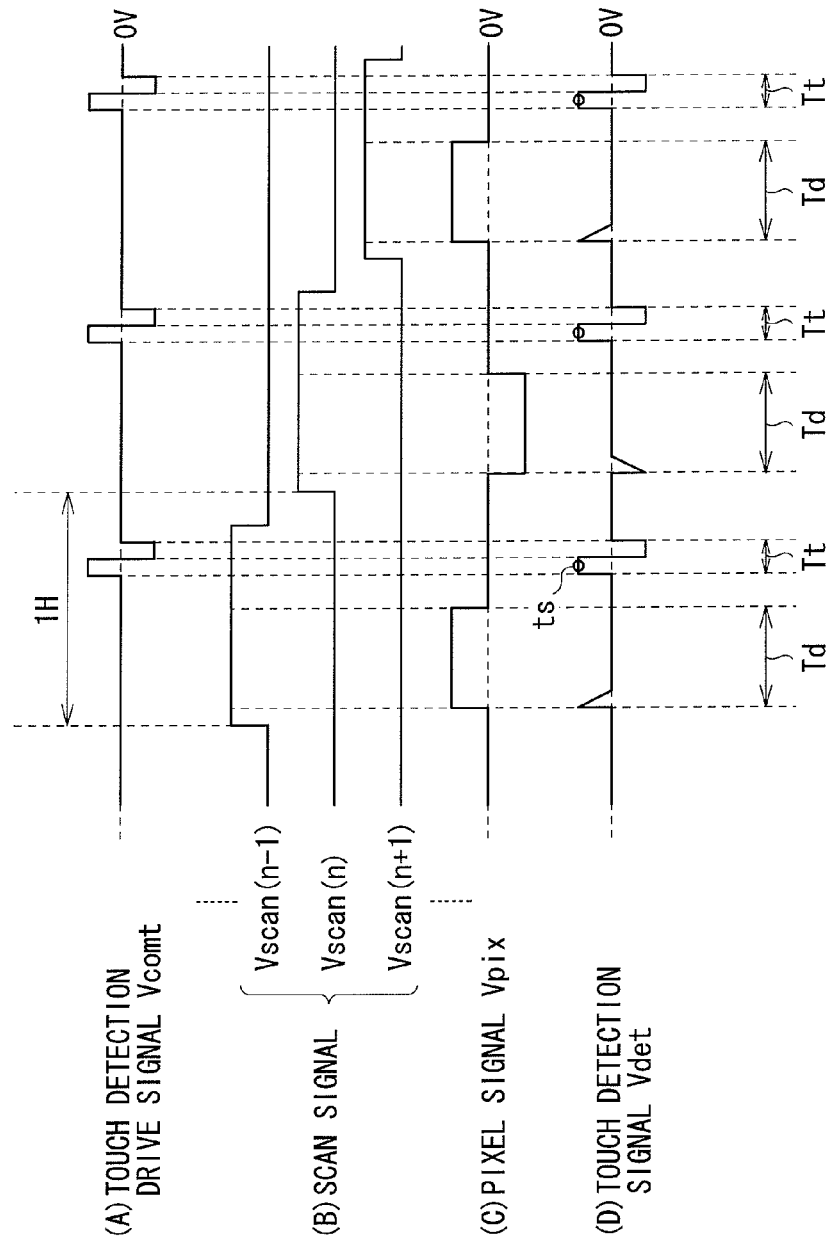
FIG. 26 is a timing waveform chart illustrating an operation example of the display device with the touch detecting function according to another modification of the second embodiment.

Although the touch detection period Tt is provided before the display period Td in the foregoing embodiments, it is not limited thereto. Alternatively, for example, the touch detection period Tt may be provided after the display period Td or may be provided before and after the display period Td. FIG. 26 illustrates an example of the timing waveform in the case where the touch detection period Tt is provided after the display period Td. In this case as well, in a manner similar to the foregoing embodiment, the display operation and the touch detecting operation are performed.

4. Application Examples

Referring now to FIGS. 27 to 31G, application examples of the display devices with the touch detecting function mentioned in the foregoing embodiments and the modifications will be described below. The display devices with the touch detecting function of the embodiments and the like are applicable to an electronic unit in all of fields such as a television apparatus, a digital camera, a notebook-sized personal computer, a portable terminal device such as a cellular phone, a video camera, or the like. In other words, the display device with the touch detecting function of the embodiments and the like are applicable to electronic units in all of fields, which displays a video signal input from the outside or a video signal generated on the inside as an image or a video image.

Application Example 1

Figure 27:
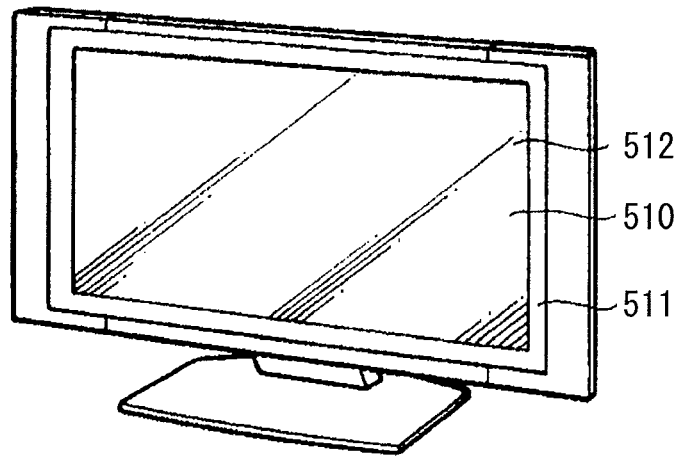
FIG. 27 is a perspective view illustrating an appearance configuration of application example 1 of a liquid crystal display device to which the embodiment is applied.

FIG. 27 illustrates the appearance of a television apparatus to which the display device with the touch detecting function according to any one of the embodiments and the like is applied. The television apparatus has, for example, a video display screen unit 510 including a front panel 511 and a filter glass 512. The video display screen unit 510 is constructed by the display device with the touch detecting function according to any one of the foregoing embodiments and the like.

Application Example 2

Figure 28A:
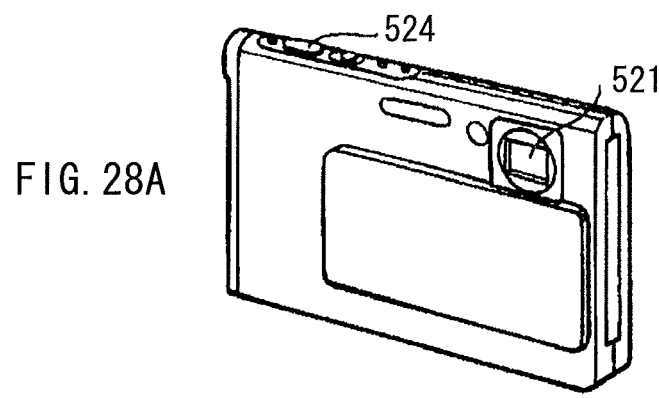
FIGS. 28A and 28B are perspective views illustrating an appearance configuration of application example 2.
Figure 28B:
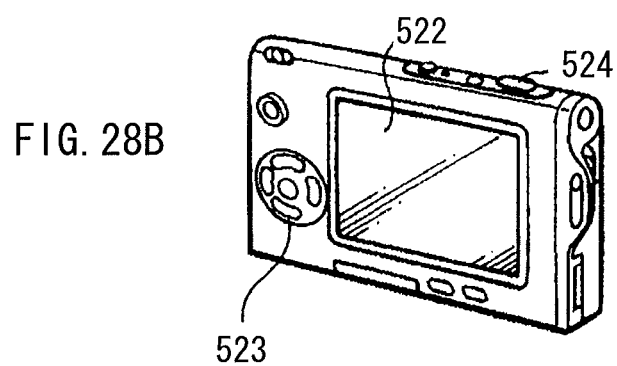

FIGS. 28A and 28B illustrate the appearance of a digital camera to which the display device with the touch detecting function according to any one of the embodiments and the like is applied. The digital camera has, for example, a light emitting unit 521 for flash, a display unit 522, a menu switch 523, and a shutter button 524. The display unit 522 is constructed by the display device with the touch detecting function according to any one of the embodiments and the like.

Application Example 3

Figure 29:
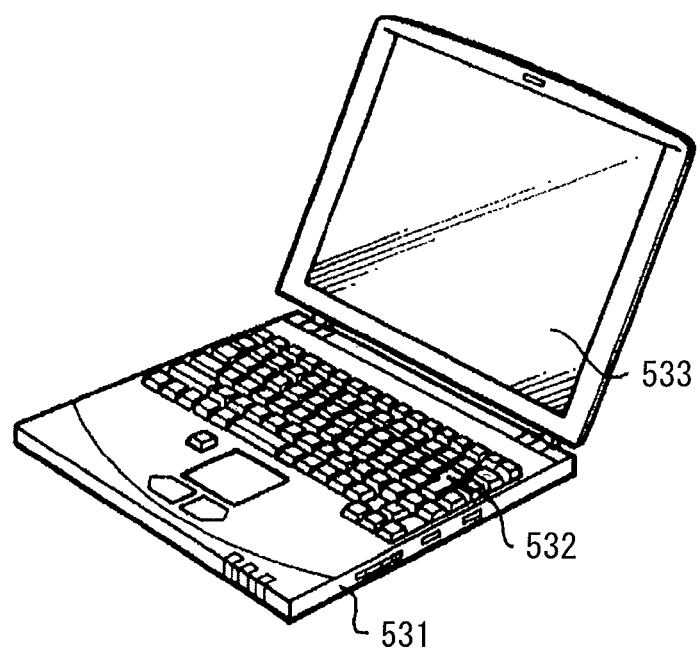
FIG. 29 is a perspective view illustrating an appearance configuration of application example 3.

FIG. 29 illustrates the appearance of a notebook-sized personal computer to which the display device according to any one of the embodiments and the like is applied. The notebook-sized personal computer has, for example, a body 531, a keyboard 532 for operation of inputting characters and the like, and a display unit 533 for displaying an image. The display unit 533 is constructed by the display device with the touch detecting function according to any one of the embodiments and the like.

Application Example 4

Figure 30:
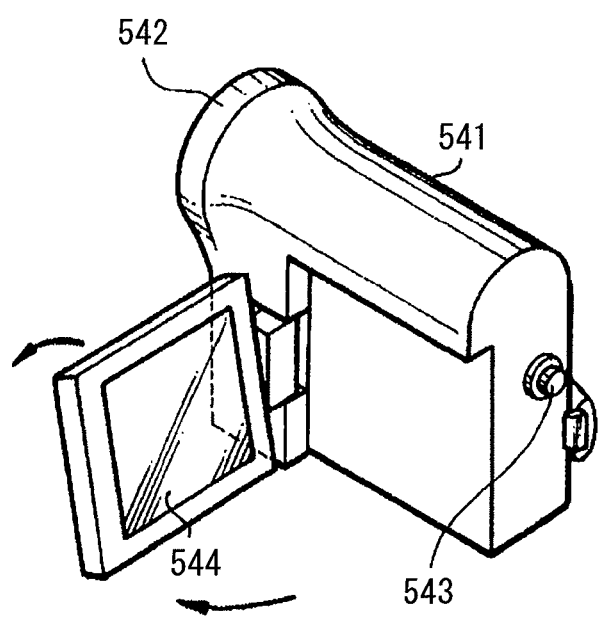
FIG. 30 is a perspective view illustrating an appearance configuration of application example 4.
Figure 31:
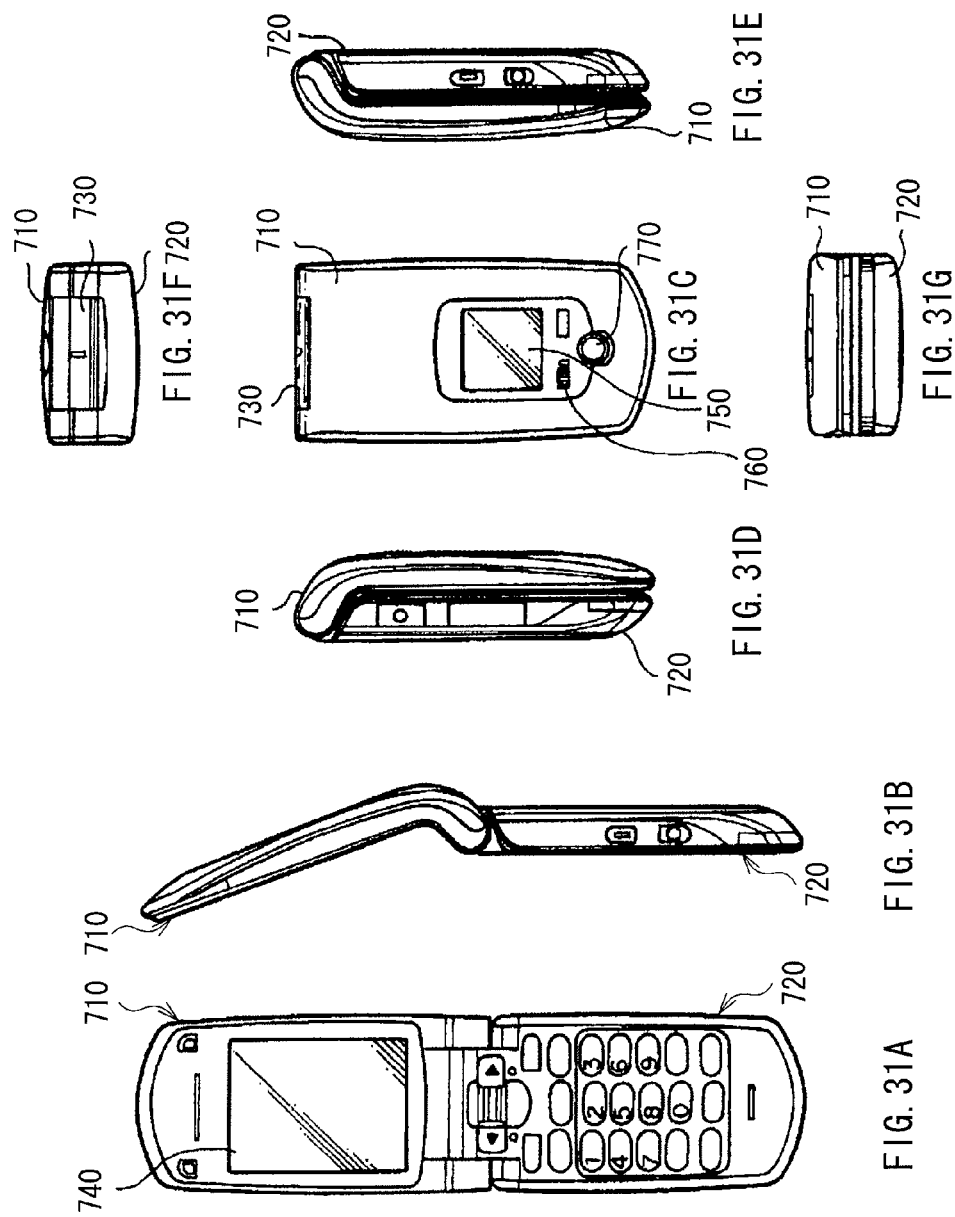
FIG. 31A is a front view in an open state.
FIG. 31B is a side view in the open state.
FIG. 31C is a front view in a closed state.
FIG. 31D is a left side view.
FIG. 31E is a right side view.
FIG. 31F is a top view.
FIG. 31G is a bottom view, each illustrating an appearance configuration of application example 5.

FIG. 30 illustrates the appearance of a video camera to which the display device with the touch detecting function according to any one of the embodiments and the like is applied. The video camera has, for example, a body 541, a lens 542 for photographing a subject, provided in the front-side face of the body 541, a shooting start/stop switch 543, and a display unit 544. The display unit 544 is constructed by the display device with the touch detecting function according to any one of the embodiments and the like.

Application Example 5

FIGS. 31A to 31G illustrate the appearance of a cellular phone to which the display device with the touch detecting function according to any one of the embodiments and the like is applied. The cellular phone is constructed by, for example, coupling an upper casing 710 and a lower casing 720 by a coupling part (hinge) 730, and has a display 740, a sub-display 750, a picture light 760, and a camera 770. The display 740 or the sub-display 750 is constructed by the display device with the touch detecting function according to any one of the embodiments and the like.

Although the present application has been described above by the embodiment, the modifications, and the examples of application to electronic units, the present application is not limited to the embodiment and the like but may be variously modified.

Figure 32:
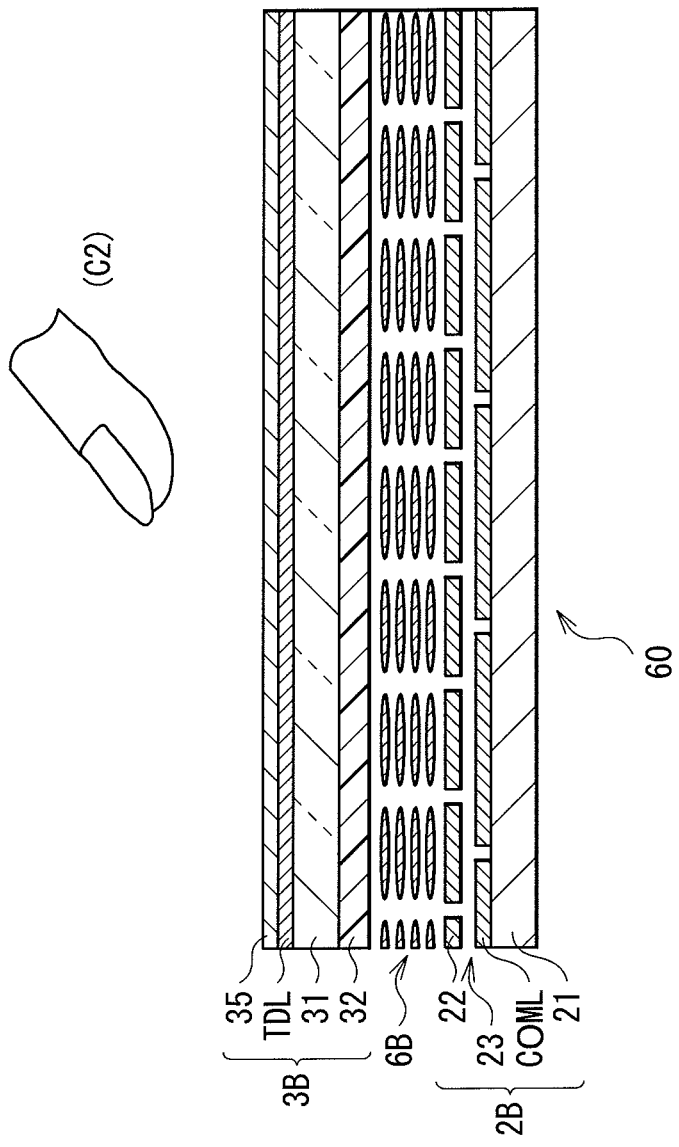
FIG. 32 is a cross section illustrating a schematic sectional structure of a display unit with a touch detecting function according to a modification of each of the embodiments of the application.

In the foregoing embodiments, the display unit 10 with the touch detecting function is formed by integrating the liquid crystal display unit 20 using a liquid crystal of any of various modes such as TN, VA, and ECB and the touch detection unit 30. Alternatively, a liquid crystal display unit using a liquid crystal in the transverse electric field mode such as an FFS (Fringe Field Switching) or IPS (In-Plane Switching) and the touch detection unit may be integrated. For example, in the case of using the liquid crystal in the transverse electric field mode, a display unit 60 with a touch detecting function is constructed as illustrated in FIG. 32. The diagram illustrates an example of a sectional structure of a main part of the display unit 60 with the touch detecting function, and illustrates a state where a liquid crystal layer 6B is sandwiched between a pixel substrate 2B and an opposed substrate 3B. The names, functions, and the like of the other parts are similar to those in the case of FIG. 5, and their description will not be repeated. In this example, unlike the case of FIG. 5, the drive electrode COML which is used for both display and touch detection is formed immediately above the TFT substrate 21 and serves as a part of the pixel substrate 2B. The pixel electrode 22 is disposed above the drive electrode COML via an insulating layer 23. In this case, all of dielectrics including a liquid crystal layer 6B existing between the drive electrode COML and the touch detection electrode TDL contribute to formation of a capacitance C1.

Figure 33A:
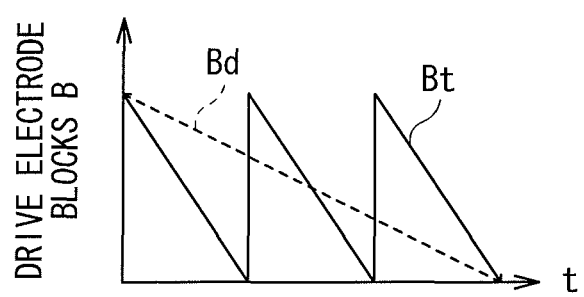
FIGS. 33A and 33B are diagrams illustrating an example of the operation of a drive electrode driver according to a modification of each of the embodiments of the application.
Figure 33B:
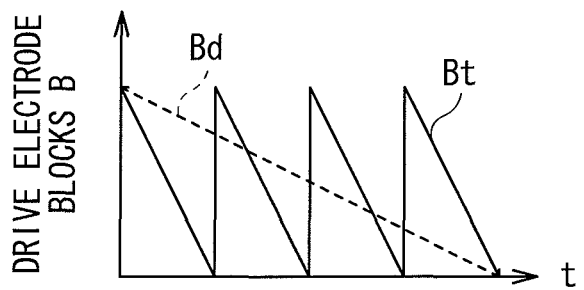

Also, in the embodiments, the scanning frequency of the touch detecting operation is set twice as high as that of the display operation, although it is not limited thereto. Alternatively, the scanning frequency of the touch detecting operation may be set, for example, three times or four times as high as that of the display operation. FIGS. 33A and 33B schematically illustrate the moving operation in the display/touch detection face S of the drive electrode blocks Bd and Bt. FIG. 33A illustrates the case where the scanning frequency of the touch detecting operation is three times as high as that of the display operation. FIG. 33B illustrates the case where the scanning frequency of the touch detecting operation is four times as high as that of the display operation. In FIG. 33A, while the drive electrode blocks Bd are sequentially selected and a scan is performed once in the display operation, the drive electrode blocks Bt are sequentially selected and a scan is performed three times in the touch detecting operation. That is, in this example, the scanning frequency of the touch detecting operation is three times as high as that of the display operation. In FIG. 33B, while the drive electrode blocks Bd are sequentially selected and a scan is performed once in the display operation, the drive electrode blocks Bt are sequentially selected and a scan is performed four times in the touch detecting operation. That is, in this example, the scanning frequency of the touch detecting operation is four times as high as that of the display operation.

Further, in the foregoing embodiments, the display device with a touch detecting function is of the so-called in-cell-type obtained by integrating a liquid crystal display unit and a capacitive touch detection unit. Alternatively, a display device of an assembly type obtained by assembling a liquid crystal display unit and a capacitive touch detection unit as separate members may be used. In this case, the liquid crystal display unit performs displaying by, for example, inverting a drive signal (common drive signal) to be applied to the drive electrode (common electrode). The touch detection unit has, for example, an electrode configuration as illustrated in FIG. 7. In a manner similar to the embodiment, the touch detection unit sequentially applies the touch detection drive signal Vcomt to the drive electrode COML, and detects a touch on the basis of the touch detection signal Vdet output from the touch detection electrode TDL in accordance with the touch detection drive signal Vcomt. In the case where a capacitance is formed between the common electrode of the liquid crystal display unit and the touch detection electrode TDL of the capacitive touch detection unit, in a manner similar to the foregoing embodiment, the common drive signal applied to the common electrode of the liquid crystal display unit may be transmitted to the touch detection electrode TDL of the touch detection unit via the capacitance. At this time, by allowing the waveform of the touch detection drive signal Vcomt of the touch detection unit to change at a timing when the waveform of the common drive signal of the liquid crystal display unit does not change, in a manner similar to the foregoing embodiment, the touch detection signal Vdet according to the touch detection drive signal Vcomt is separated, and the influence on the displaying operation of the touch detecting operation is minimized.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A display device with touch detection comprising:
a plurality of display elements;
a plurality of common electrodes arranged in parallel and that extend in first direction;
a plurality of detection electrodes arranged in parallel and that extend in a direction across the first direction;
a plurality of signal lines connected to the plurality of display elements, respectively, and to which a display drive signal is applied;
a detection circuit configured to detect an external proximity object based on a touch detection signal which is output from the detection electrodes,
a scan driving unit configured to drive the common electrodes with a touch detection drive signal,
wherein the detection circuit is configured to sample a first voltage of the touch detection signal at a first timing before a starting of transition of the touch detection drive signal, and sample a second voltage of the touch detection signal at a second timing after the starting of transition of the touch detection drive signal, the second voltage being different from the first voltage,
wherein detection of the external proximity object is performed on the basis of the difference between the first voltage of the touch detection signal sampled at the first timing and the second voltage of the touch detection signal sampled at the second timing, and
wherein the display drive signal is substantially constant during the period between the first timing and the second timing.

* * * * *